United States Patent
Chamberland et al.

(10) Patent No.: US 12,528,085 B2
(45) Date of Patent: Jan. 20, 2026

(54) DEVICES AND METHODS FOR PIPETTE ALIGNMENT

(71) Applicant: IDEXX Laboratories, Inc., Westbrook, ME (US)

(72) Inventors: Kevin Chamberland, Portland, ME (US); Jennifer Cote, Wells, ME (US); Regina Lee Reif, Duluth, GA (US); Michael Thorpe, Rochester, NH (US); Jennifer Curtis, Bath, ME (US); Arvind Dev, Scarborough, ME (US); Julie Rollins, South Portland, ME (US); Andrey Asanov, Buxton, ME (US)

(73) Assignee: IDEXX LABORATORIES, INC, Westbrook, ME (US)

(*) Notice: Subject to any disclaimer, the term of this patent is extended or adjusted under 35 U.S.C. 154(b) by 466 days.

(21) Appl. No.: 18/078,510

(22) Filed: Dec. 9, 2022

(65) Prior Publication Data

US 2023/0182143 A1    Jun. 15, 2023

Related U.S. Application Data

(60) Provisional application No. 63/288,408, filed on Dec. 10, 2021, provisional application No. 63/288,397, filed on Dec. 10, 2021, provisional application No. 63/288,378, filed on Dec. 10, 2021, provisional application No. 63/288,386, filed on Dec. 10, 2021.

(51) Int. Cl.
*B01L 9/06* (2006.01)
*A61J 1/20* (2006.01)
(Continued)

(52) U.S. Cl.
CPC ............... *B01L 9/06* (2013.01); *A61J 1/2096* (2013.01); *A61M 5/1782* (2013.01); *A61M 5/19* (2013.01);
(Continued)

(58) Field of Classification Search
CPC ......... B01L 2200/025; B01L 2200/021; B01L 9/06; B01L 9/54; G01N 35/1011
See application file for complete search history.

(56) References Cited

U.S. PATENT DOCUMENTS 5,646,049 A    7/1997    Tayi
6,270,249 B1   8/2001    Besuner et al.
(Continued)

FOREIGN PATENT DOCUMENTS

JP    2013 072687        4/2013
WO    WO2016168692 A1    10/2016

OTHER PUBLICATIONS

International Search Report and Written Opinion issued in International Application No. PCT/US2022/052374 dated Jul. 21, 2023.
(Continued)

*Primary Examiner* — Paul S Hyun
(74) *Attorney, Agent, or Firm* — McDonnell Boehnen Hulbert & Berghoff LLP

(57) ABSTRACT

A device comprising a base and a support structure is disclosed. The base includes a vial receptacle for holding a vial. The support structure is coupled to an upper portion of the base and is configured to align a pipette comprising a pipette tip vertically over the vial receptacle. The support structure is configured to support a pipette such that an end of a pipette tip is positioned one or more predetermined depths within a vial in the vial receptacle.

14 Claims, 22 Drawing Sheets

(51) Int. Cl.

| | |
|---|---|
| *A61M 5/178* | (2006.01) |
| *A61M 5/19* | (2006.01) |
| *B01L 9/00* | (2006.01) |
| *G01N 1/00* | (2006.01) |
| *G01N 1/08* | (2006.01) |
| *G01N 1/10* | (2006.01) |
| *G01N 1/28* | (2006.01) |
| *G01N 21/88* | (2006.01) |
| *G01N 33/543* | (2006.01) |
| *G01N 1/18* | (2006.01) |

(52) U.S. Cl.
 CPC .................. *B01L 9/54* (2013.01); *G01N 1/08* (2013.01); *G01N 1/10* (2013.01); *G01N 1/2806* (2013.01); *G01N 21/8851* (2013.01); *G01N 33/54326* (2013.01); *A61J 2205/10* (2013.01); *B01L 2200/022* (2013.01); *B01L 2200/0605* (2013.01); *B01L 2300/021* (2013.01); *G01N 2001/185* (2013.01)

(56) References Cited

U.S. PATENT DOCUMENTS

| | | | |
|---|---|---|---|
| 9,144,801 B2* | 9/2015 | Johnson | .................... B01L 9/06 |
| 10,232,376 B2 | 3/2019 | Capaccio et al. | |
| 2008/0038559 A1 | 2/2008 | True | |
| 2009/0293643 A1 | 12/2009 | Powell et al. | |
| 2011/0098201 A1 | 4/2011 | Seul et al. | |
| 2011/0152127 A1 | 6/2011 | Ho | |
| 2011/0159578 A1 | 6/2011 | Godsey et al. | |
| 2011/0290890 A1* | 12/2011 | Tokunaga | ........ G01N 35/00712 422/402 |
| 2013/0034284 A1* | 2/2013 | Honkanen | ............... H04N 25/63 382/129 |
| 2013/0047751 A1* | 2/2013 | Voss | ........................ B01L 9/523 73/864.01 |
| 2014/0274778 A1* | 9/2014 | Tsao | ........................ C40B 30/04 506/14 |
| 2015/0253224 A1* | 9/2015 | Liffmann | ......... G01N 33/56972 435/40.51 |
| 2020/0164322 A1 | 5/2020 | Renick et al. | |

OTHER PUBLICATIONS

International Search Report and Written Opinion issued in International Application No. PCT/US2022/052375 dated Apr. 14, 2023.
International Search Report and Written Opinion issued in International Application No. PCT/US2022/052376 dated May 19, 2023.
International Search Report and Written Opinion issued in International Application No. PCT/US2022/052377 dated May 19, 2023.

* cited by examiner

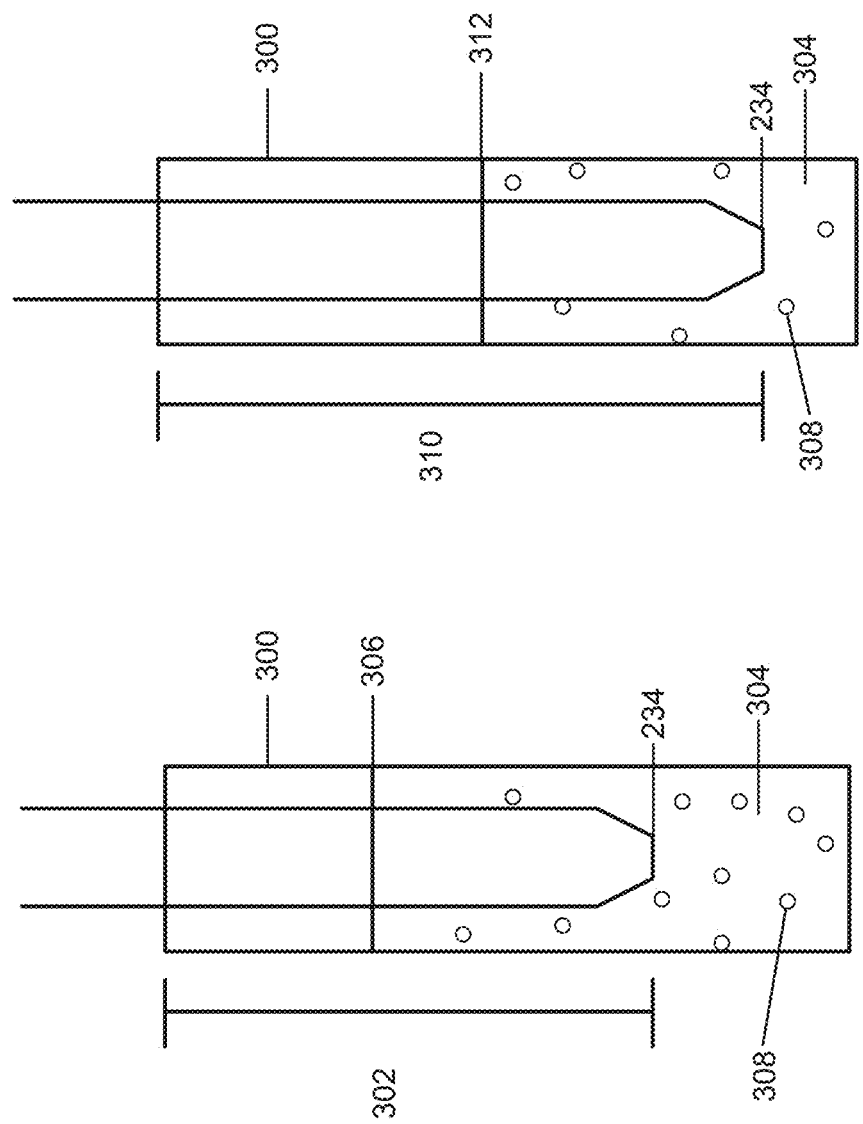

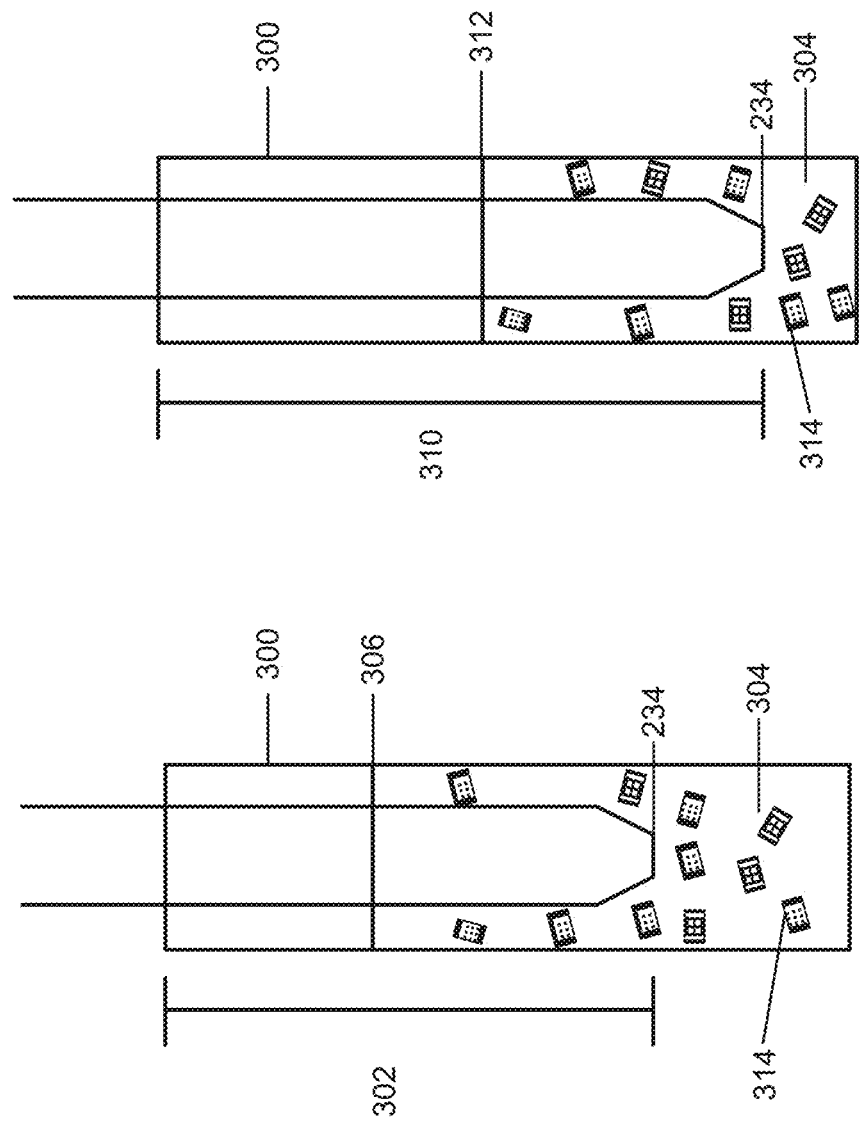

700

702 Withdrawing, via a pipette, a first volume of a solution from a vial, wherein the vial is held by a vial receptacle of a base, wherein the pipette is held vertically by a support structure coupled to an upper portion of the base, and wherein the support structure supports the pipette such that an end of a pipette tip is positioned at a first predetermined depth within the vial; and

704 Withdrawing, via the pipette, a second volume of the solution from the vial

FIG. 7

DEVICES AND METHODS FOR PIPETTE ALIGNMENT

CROSS-REFERENCE TO RELATED APPLICATIONS

This application claims priority to U.S. Provisional Patent Application No. 63/288,408, filed on Dec. 10, 2021, U.S. Provisional Patent Application No. 63/288,397, filed on Dec. 10, 2021, U.S. Provisional Patent Application No. 63/288,386, filed on Dec. 10, 2021, and U.S. Provisional Patent Application No. 63/288,378, filed on Dec. 10, 2021, each of which is hereby incorporated by reference in its entirety. Additionally, this application hereby incorporates by reference the following U.S. Patent Applications, each filed on the same date as the present application: U.S. patent application Ser. No. 18/078,519, titled "Devices and Methods for Particle Solution Testing", U.S. patent application Ser. No. 18/078,528, titled "Devices and Methods for Particle Solution Preparation", and U.S. patent application Ser. No. 18/078,531, titled "Devices and Methods for Particle Mixing".

FIELD OF THE DISCLOSURE

The present disclosure involves systems and methods for aligning a pipette while withdrawing a solution containing particles from a vial. Namely, devices and methods of the disclosure stabilize a pipette and position an end of a pipette tip at a series of predetermined depths within a vial during withdrawing events.

BACKGROUND

Assays (including immunoassays) can be conducted utilizing a variety of different solutions, including solutions containing particles to assist in performing the assays.

SUMMARY

In particular, the particles may include paramagnetic beads or polystyrene particles, suspended within a solution that can be withdrawn with a pipette for testing and identification of components in the solutions. To increase the accuracy of assay test results, it is desirable to withdraw approximately the same number of particles during each withdrawing event and, prior to withdrawing, ensure that the particles are dispersed evenly throughout the solution.

When operators manually withdraw solution using a pipette, however, the results of the assay may be inconsistent and/or inaccurate. For example, an operator's positioning of the pipette within a vial of the solution can significantly affect the type, number, and consistency of particles withdrawn from the solution. Inconsistency of the pipette from one withdrawing event to another can also impact the accuracy and precision of the assay results. Accordingly, manual withdrawals of the solution are subject to variability between withdrawing events and/or operators and, thus, degrade the accuracy and precision of any associated assay results.

In an example, a device is described that comprises a base comprising a vial receptacle configured to hold a vial. The device also comprises a support structure coupled to an upper portion of the base configured to align a pipette comprising a pipette tip vertically over the vial receptacle. The support structure is configured to support a pipette such that an end of a pipette tip is positioned at one or more predetermined depths within a vial in the vial receptacle.

In another example, a method is described that comprises withdrawing, via a pipette, a first volume of a solution from a vial, wherein a vial is held by a vial receptacle of a base, wherein a pipette is held vertically by a support structure coupled to an upper portion of the base, and wherein the support structure is configured to support a pipette such that an end of a pipette tip is positioned at one or more predetermined depths within a vial. The method also describes withdrawing, via a pipette, a second volume of the solution from a vial.

The features, functions, and advantages that have been discussed can be achieved independently in various examples or may be combined in yet other examples. Further details of the examples can be seen with reference to the following description and drawings.

BRIEF DESCRIPTION OF THE FIGURES

The above, as well as additional, features will be better understood through the following illustrative and non-limiting detailed description of example embodiments, with reference to the appended drawings.

FIG. 3A illustrates a vial and an end of a pipette tip of the pipette assembly of FIG. 2 at a first predetermined depth, according to an example embodiment.

FIG. 3B illustrates the vial and the end of the pipette tip of FIG. 3A at a second predetermined depth, according to example embodiment.

FIG. 3C illustrates another vial and an end of a pipette tip of the pipette assembly of FIG. 2 at a first predetermined depth, according to an example embodiment.

FIG. 3D illustrates the vial of FIG. 3C and the end of the pipette tip of FIG. 3C at a second predetermined depth, according to example embodiment.

FIG. 7 illustrates a method, according to an example embodiment.

Figure 1A:
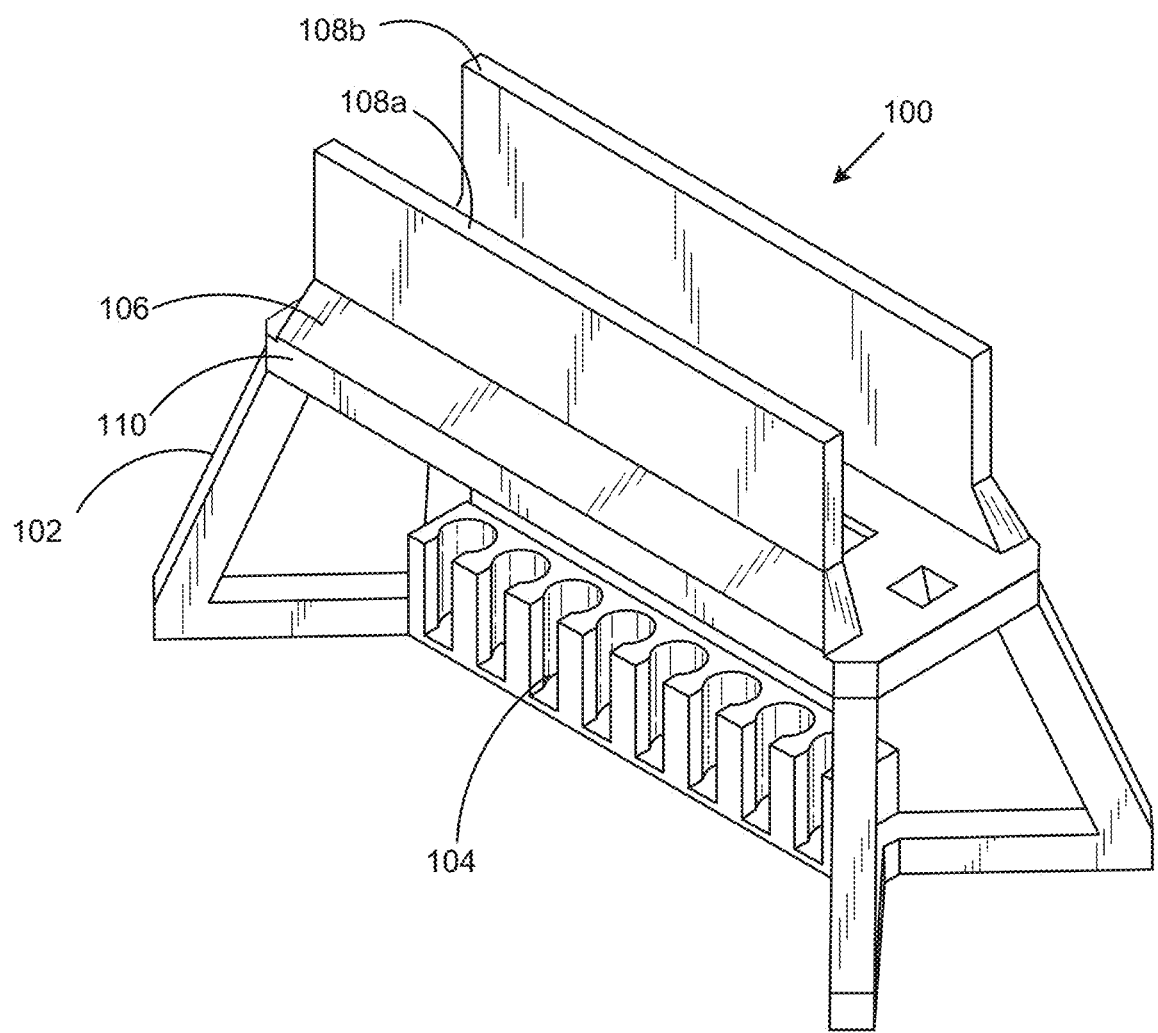
FIG. 1A illustrates an isometric view of an example pipette alignment device, according to an example embodiment.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example.

Within examples, the disclosure is directed to devices and methods for manually withdrawing samples of a solution containing one or more types of particles. In particular, as described in the example embodiments, the one or more types of particles may include one or more of the following: microbeads, microparticles, micropellets, microwafers, paramagnetic beads, microparticles, paramagnetic microparticles, or the like. In embodiments, each of the particles may include an identifying feature, such as a bar code, a nickel bar code, and/or identifying features other than bar codes, including a color, a shape, an alphanumeric symbol, and/or the like. Moreover, the particles may be magnetic or paramagnetic. Particles suitable for use in the disclosure are capable of attachment to other substances such as derivatives, linker molecules, proteins, nucleic acids, or combinations thereof. The capability of the particles to be attached to other substances can result from the particle material as well as from any further surface modifications or functionalization of the particle. The particles can be functionalized or be capable of becoming functionalized in order to covalently or non-covalently attach proteins, nucleic acids, linker molecules or derivatives as described herein. For example, the surface of the particle can be modified or functionalized with amine, biotin, streptavidin, avidin, protein A, sulfhydryl, hydroxyl and carboxyl. Particles may be spherical or other shapes, may be light transmissive and may be digitally coded such as for example, by an image that provides for high contrast and high signal-to-noise optical detection to facilitate identification of the bead. To the extent an image is present, the image may be implemented by a physical structure having a pattern that is partially substantially transmissive (e.g., transparent, translucent, and/or pervious to light), and partially substantially opaque (e.g., reflective and/or absorptive to light) to light. The pattern of transmitted light is determined (e.g., by scanning or imaging), and the code represented by the image on the coded bead can be decoded. Various code patterns, such as circular, square, or other geometrical shapes, can be designed as long as they can be recognized by an optical decoder. Examples of these one or more types of particles may be found at: U.S. Pat. Nos. 7,745,091, 8,148,139, and 8,614,852.

Additionally or alternatively, the one or more types of particles may comprise one or more materials, including one or more of the following: glass, polymers, polystyrene, latex, elemental metals, ceramics, metal composites, metal alloys, silicon, or of other support materials such as agarose, ceramics, glass, quartz, polyacrylamides, polymethyl methacrylates, carboxylate modified latex, melamine, and Sepharose, and/or one or more hybrids thereof. In particular, useful commercially available materials include carboxylate modified latex, cyanogen bromide activated Sepharose beads, fused silica particles, isothiocyanate glass, polystyrene, and carboxylate monodisperse microspheres. Furthermore, the one or more types of particles may also comprise one or more specific shapes, dimensions, and/or configurations and may be modified for one or more specific uses. For example, the particles may be a variety of sizes from about 0.1 microns to about 100 microns, for example about 0.1, 0.5, 1.0, 5, 10, 20, 30, 40 50, 60, 70, 80 90 or 100 microns. For example, the one or more types of particles may be surface modified and/or functionalized with biomolecules for use in biochemical analysis.

The particles of the disclosure may be used in various homogenous, sandwich, competitive, or non-competitive assay formats to generate a signal that is related to the presence or amount of an analyte in a test sample. The term "analyte," as used herein, generally refers to the substance, or set of substances in a sample that are detected and/or measured, either directly or indirectly. In various aspects the assays of the disclosure, examples include sandwich immunoassays that capture an analyte in a sample between a binding member (e.g., antibody) attached to the particle and a second binding member for the analyte that is associated with a label. In another example embodiment, the binding member on the particle may be an antigen (e.g., protein) that binds an antibody of interest in a patient sample in order to capture the antibody on the particle. The presence of the antibody can then be detected with a label conjugated to a second binding member specific for an antibody. The second binding member attached to the label may be the antigen conjugated to the label or the binding member may itself be an antibody (e.g., anti-species antibody) that is conjugated to the label. In example embodiments, these characteristics may be referred to herein as a "unique identifying feature" of the particle. Other examples are possible. For example, the particle may also bind to a fluorescent tag or label, which may present a "unique identifying feature" of the particle to which the fluorescent tag or label might bind under a fluorescent lighting.

In another example embodiment, the assay methods of the disclosure are competitive immunoassays for detection of antibody in the sample. A competitive immunoassay may be carried out in the following illustrative manner. A sample, from an animal's body fluid, potentially containing an antibody of interest that is specific for an antigen, is contacted with the antigen attached to the particle and with the anti-antigen antibody conjugated to a detectable label. The antibody of interest, present in the sample, competes with the antibody conjugated to a detectable label for binding with the antigen attached to the particles. The amount of the label associated with the particles can then be determined after separating unbound antibody and the label. The signal obtained is inversely related to the amount of antibody of interest present in the sample.

In an alternative example embodiment of a competitive a sample, an animal's body fluid, potentially containing an analyte, is contacted with the analyte conjugated to a detectable label and with an anti-analyte antibody attached to the particle. The antigen in the sample competes with analyte conjugated to the label for binding to the antibody attached the particle. The amount of the label associated with the particles can then be determined after separating unbound antigen and label. The signal obtained is inversely related to the amount of analyte present in the sample.

Antibodies, antigens, and other binding members may be attached to the particle or to the label directly via covalent binding with or without a linker or may be attached through a separate pair of binding members as is well known (e.g., biotin:streptavidin, digoxigenin:anti-digoxiginen).

Assays using solutions containing these one or more types of particles are often conducted over a series of withdrawing events, potentially from the same vial. In practice, the particles in the solution may bind together (often referred to as "clumping") or bind and/or settle on the bottom or sides of the vial. This binding may result in an inconsistent dispersion of the particles in the solution. For example, the relative density of the particles may be lower than the density of the solution, which may result in the particles floating to the top of the solution and inconsistent particle dispersion throughout the solution. In another example, in instances where the particles bind/settle on the bottom or sides of the vial, these particles may not be withdrawn at all, as they may be unable to be withdrawn by a pipette tip placed in the solution.

When these particles clump together, they may not be accurately identified or accounted for in the assay. To help address this issue, the pipette can perform one or more functions to help alleviate the settling and/or clumping of the particles in solution. For example, the pipette tip may agitate the solution via aspiration or the like before a withdrawing event to more consistently disperse the particles in the solution.

Moreover, other issues may affect the consistency of the assay results and/or the type and consistency of particles dispersed within the solution. For example, the depth of the pipette within the vial and/or movement of an operator during withdrawal still may produce inconsistent and/or inaccurate assay results.

To help address these issues, a pipette alignment device can be utilized to stabilize and align a pipette over vials containing the solution to assist in the withdrawal of the solution from the vial. In particular, the pipette alignment device stabilizes the pipette during agitation and withdrawal so that particles within the solution are consistently dispersed during each of the withdrawing events to reduce variability between assays and operators.

Additionally, devices and methods described herein can position ends of one or more pipette tips at one or more predetermined depths within a set of vials such that the ends of the pipette tips are at a consistent coordinate position within a volume of the solution. By doing so, the accuracy of the particle count and/or type withdrawn from solution may improve pipetting procedures as compared to conventional pipetting procedures, techniques, and associated devices. For example, positioning the end of the pipette tip at or near the center or middle of the volume (e.g., the center line of the height of the solution in the vial or the "vertical center") may allow the pipette to more consistently aspirate and agitate the solution to produce more accurate and consistent particle counts compared to other positions such as the bottom of the solution or the top of the solution. As such, in example embodiments, the pipette alignment device and methods described herein position a pipette such that, during a withdrawing event, the end of the pipette tip is at or near the vertical and/or horizontal center of the volume of the solution or another position that is consistent, on a relative volume basis, for withdrawn from the vial.

Similarly, positioning the end of the pipette tip at or near the center or middle of the horizontal cross section of the vial (the "horizontal center") may allow the pipette to more consistently aspirate and/or agitate the solution. As used in this disclosure, horizontal indicates a direction transverse to the vertical direction, and extending outward from a vertical centerline of the referenced body (e.g., the horizontal center of a vial stabilized in one position in a vial receptacle). This specific positioning can produce more accurate and consistent particle counts compared to other positions, such as the side of the vial. As such, in example embodiments, the pipette alignment device and methods described herein position a pipette such that, during a withdrawing event, the end of the pipette tip is at near the horizontal center of the vial for withdrawal from the vial.

In practice, removal of the contents of a vial may be performed over a series of withdrawing events. For example, a first volume of the solution may be withdrawn, and a first assay conducted. Then a second volume of the solution may be withdrawn, and second assay conducted. This process may be repeated a number of times (e.g., 10). As noted above, during each of the withdrawing events it may be beneficial for the withdrawing tip of the pipette to be in the vertical and/or horizontal center of the solution to withdraw a consistent number of particles in each withdrawing event. However, as the volume of solution is reduced with each withdrawing event, the vertical center of the solution becomes lower within the vial. Thus, attaining consistent vertical positioning of the pipette within the solution as the volume decreases may also provide more consistent assay results (e.g., by improving the consistency of the amount and/or type of particles withdrawn at each withdrawing event over the series of withdrawing event).

Devices and methods of the present disclosure involve positioning a pipette such that the end of the pipette tip is at or near the vertical and/or horizontal center of the solution or another consistent location (e.g., 30%, 40%, 50%, 60% or 70% of the height of the solution) during each withdrawing event in a series of withdrawing events. Namely, a pipette alignment device includes an adjustable platform configured to raise and lower the pipette with respect to the vials to adjust the depth of the end of the pipette tip within the vials. In embodiments, the pipette alignment device and method described herein provides support and stability to a pipette during a withdrawing event to reduce variability among operators.

While the vertical center of the vial is typically appropriate for most series of withdrawing events, another position within the solution for each withdrawing event may also be desirable depending on the amount of solution and the type of particles within the vial. Indeed, in embodiments, the position of the pipette tip may be adjusted with each withdrawing event to accommodate the amounts of solutions and the particles. For instance, as the solution depth diminishes, the vertical center may be too close to the bottom of the vial in order to provide a withdrawal of solution with number of particles that is consistent with the particles from a previous withdrawing event. For example, as the vertical center becomes too close to the bottom of the vial, the particles may cling to the bottom of the vial and/or settle at the bottom of the vial due to one or more factors (e.g., gravity), the withdrawing position may be adjusted to compensate and provide a more homogeneous solution withdrawing evert. For example, once the vertical center becomes too close to the bottom of the vial, the withdrawing position may be adjusted to withdraw at a distance that is great than the vertical center of the remaining solution (e.g. to withdraw a solution that is less concentrated with particles as compared to the solution at the vertical center).

In another example, in vials that contain solution that has not been agitated and/or had any solution withdrawn, the vertical center may be too far from particles settled on the bottom of the vial to adequately mix the solution and particles to provide a homogenous solution. Therefore, while the device and methods of the disclosure are described herein as aligning the pipette tip at the vertical center of the vial, it should be understood that other locations are possible in the series of withdrawing event, including positions that change with each event relative to the amount of solution in the vial (e.g., at 30%, 40%, 50%, 60% or 70% of the height of the solution).

Figure 1B:
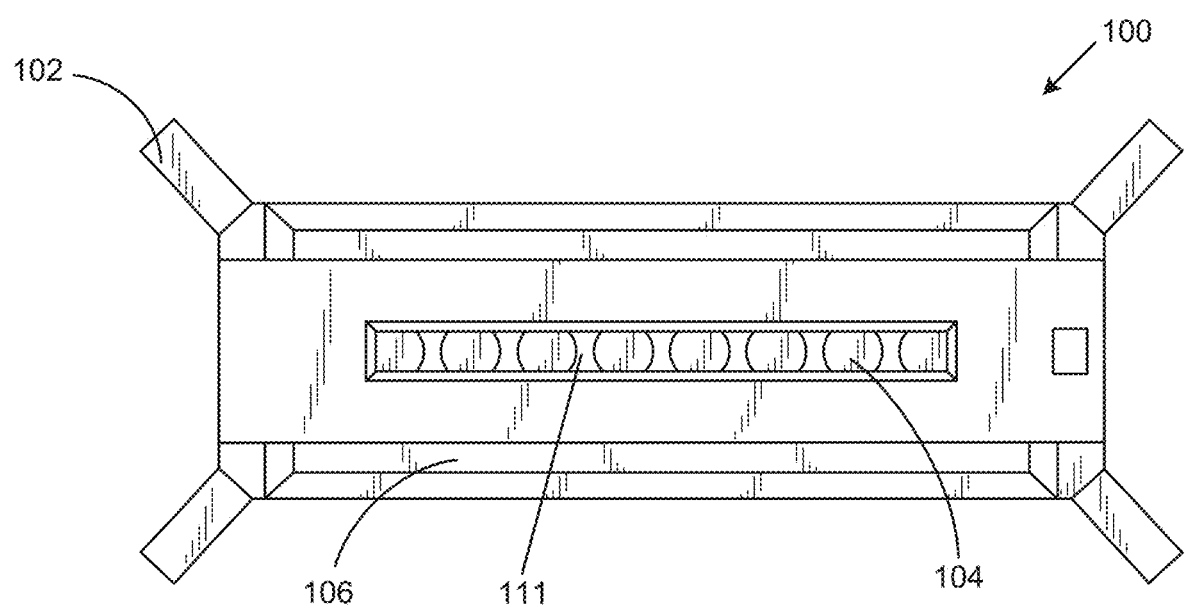
FIG. 1B illustrates a top view of the example pipette alignment device of FIG. 1A, according to an example embodiment.

Referring now to the figures, FIGS. 1A-1B illustrate an example device 100 for aligning a pipette. In example embodiments, the device 100 includes a base 102 and a support structure 106 coupled to an upper portion of the base 102. The base 102 includes one or more vial receptacles 104 for receiving vials.

Figure 4A:
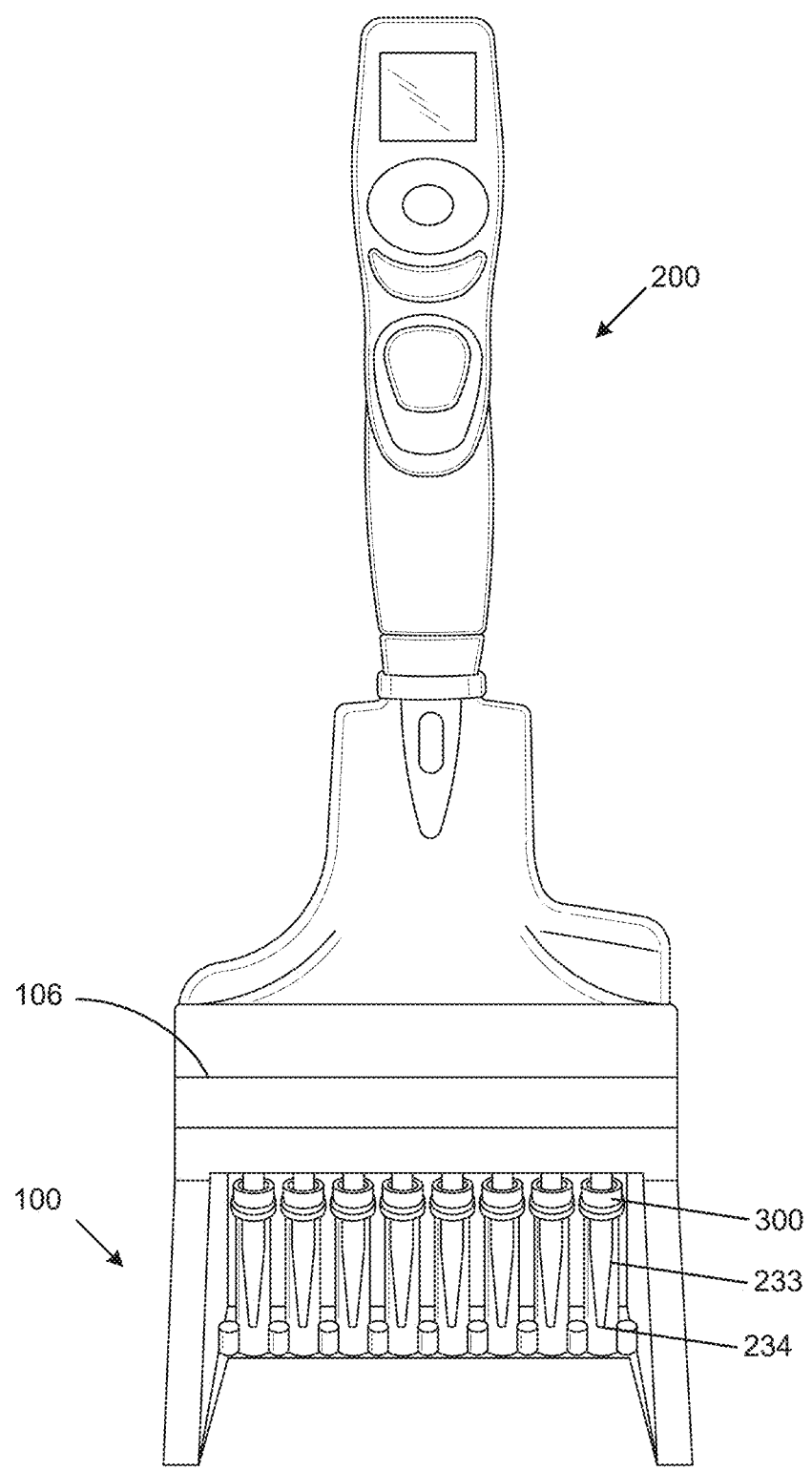
FIG. 4A illustrates the pipette alignment device of FIGS. 1A and 1B, the pipette assembly of FIG. 2, and the vials of FIGS. 3A-3D, interacting according to an example embodiment.
Figure 4B:
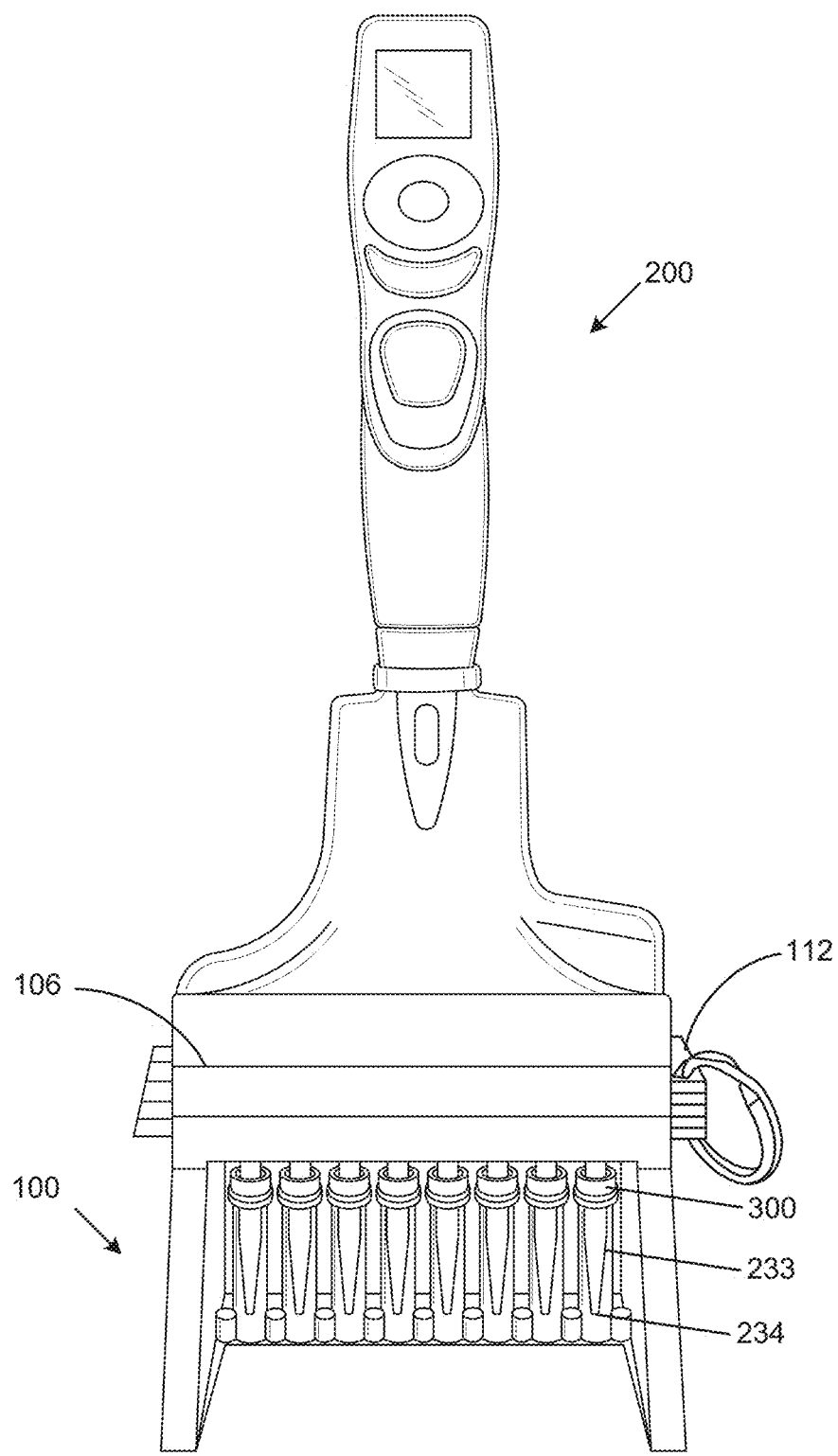
FIG. 4B illustrates the pipette alignment device FIGS. 1C and 1D, the pipette assembly of FIG. 2, and the vials of FIGS. 3A-3D interacting according to an example embodiment.

In an example embodiment, the device 100 aligns a pipette (for example, the pipette shown in FIG. 2) over vials (for example, the arrangement shown in FIGS. 4A-4B). Namely, the support structure 106 and the base 102 support and align the position of a pipette such that the end of the pipette tip is at one or more predetermined depths within a vial during different withdrawing events. Additionally or alternatively, the support structure 106 and base 102 align the position of the pipette tip such that the end of the pipette tip is at the horizontal center of a vial in the vial receptacle 104.

In example embodiments, the predetermined depths correspond to the parameters of a series of withdrawing events, such as the volume of solution within the vial during a withdrawing event. In particular, in embodiments, one or more predetermined depths of the end of the pipette tip in the solution correspond to the one or more volumes of solution withdrawn over a series of withdrawing events. As described above it is often desirable to position the end of the pipette tip at or near the vertical center of the solution, as well as position the end of the pipette tip at or near the horizontal center of the solution. For example, the volume of solution corresponds to the one or more predetermined depths of the anticipated vertical center of the solution during each withdrawing event. In embodiments, the anticipated vertical center of the solution may correspond to the anticipated vertical center of the solution at the beginning of the withdrawing event. In other examples, the anticipated vertical center of the solution may correspond to the anticipated vertical center of the solution at the conclusion of the withdrawing event. In other examples, the anticipated vertical center of the solution may correspond to the anticipated vertical center of the solution at the conclusion of a particular withdrawing event in a series of withdrawing events (e.g., the vertical center of the solution after a first withdrawing event in a series of two withdrawing events). In any event, positioning the end of the withdrawing tip of the pipette at or near the center of the solution positions the pipette tip to provide consistent agitation of the solution, including any particles therein, which is desirable for testing.

The base 102 includes the one or more vial receptacles 104, suitable for holding vials. In examples, the vial receptacles 104 are configured to hold a variety of vials, some or all of which may meet Society for Biomolecular Screening ("SBS") standards or other industry standard for laboratory equipment. In FIGS. 1A-1B, the vial receptacles 104 are aligned to position the vials such that a multi-channel pipette (for example, and SBS standard pipette shown in FIG. 2) can be inserted and take withdrawals from each of the vials. Namely, the vial receptacles 104 are designed to space vials similarly to standardized pipette tips. Additionally, although various components of the systems and/or methods described herein may refer to SBS-compliant components, they are described for the purposes of illustrating example embodiments and other, additional components may be utilized. For example, the one or more vial receptacles 104 may be arranged to accommodate smaller or larger vials and/or more or less vials than those illustrated in FIGS. 1A-1B.

In examples, the vial receptacles 104 may be adjustable to hold different sizes, numbers, or types of vials. Additionally or alternatively, the height of the base 102 may be adjustable to accommodate different types of pipettes and/or pipette tips. In some examples, the height of the base 102 may also be adjusted to position the end of the pipette tip at one or more predetermined depths during a withdrawing event.

In example embodiments, the vial receptacles 104 are designed to partially surround standard SBS vials and may include a semi-circular shape, as shown in FIGS. 1A-1B. Alternatively, in another example, the vial receptacles 104 may be designed to fully surround standard SBS vials, and may include a circular shape or the like. In yet another example, the vial receptacles 104 may hold standard SBS vials in a different manner. In embodiments, the vial receptacles 104 are molded into the base 102 (e.g., as multi-vial receptacle tray or other structures). In embodiments, the vial receptacles 104 integrate with the base 102, but may be interchanged with the base 102 to allow additional functionality (e.g., a first vial receptacle tray that accommodates eight vials that can be removed and replaced with a second vial receptacle tray that accommodates ten vials). In embodiments, one or more vials may be molded into the vial receptacles 104 and/or other components of the device 100.

In embodiments, an upper portion of the base 102 is coupled to the support structure 106 which is configured to align a pipette vertically and/or horizontally within the vials held in the vial receptacles 104. In embodiments, the support structure 106 can be detachably coupled to the upper portion of the base 102, for example, by way of a fastening mechanism or fastening mechanisms. In embodiments, the support structure 106 and base 102 is monolithic.

In example embodiments, as shown in FIG. 1A, the support structure 106 includes a forward sidewall 108a extending vertically from a first portion of a plate 110 and a rearward sidewall 108b extending vertically from a second portion of the plate 110. As shown in FIG. 1A, the first portion of the plate 110 corresponds to a forward portion of the plate 110 and the second portion of the plate 110 corresponds to a rearward portion of the plate 110. The plate 110 generally extends horizontally to support the position of a pipette in a horizontal direction relative to the plate 110 and/or vial receptacles 104 (as well as one or more vials that may be held in vial receptacles 104). To do so, in embodiments, plate 110 may position and/or stabilize a pipette assembly or individual components thereof (e.g., by restricting movement of the pipette assembly or individual components thereof in a horizontal direction). In embodiments, the plate 110 is coupled to the base 102. In example embodiments, the plate 110 can include fastening mechanisms so that the plate 110 can attach and detach from the base 102 in a manner that is not destructive to the plate 110, the base 102, and/or other components of the pipette alignment device 100. In these examples, the base 102 includes a fastening mechanism or fastening mechanisms that are complementary to the fastening mechanisms of the plate 110.

In embodiments, the plate 110 defines an opening 111 extending through the plate 110 in the vertical direction, such that a pipette tip can reach the vials through the plate 110. In examples, the opening 111 may completely surround the pipette based on a particular pipette shape or configuration (e.g., the opening 111 may include eight circular opening corresponding to eight pipettes inserted into the opening). In other examples, the opening 111 may partially surround the pipette (e.g., the rectangular-shaped opening 111 shown in FIGS. 1A-1B).

In practice, the forward sidewall 108a and rearward sidewall 108b work in combination to stabilize a pipette in the device 100. Namely, the forward sidewall 108a and rearward sidewall 108b may support at least a portion of the pipette to stabilize the pipette vertically during withdrawal of solution within the vials. In a solution containing particles, stabilization of a pipette is desirable to reduce variability among operators by reducing inconsistencies between particle counts over a series of withdrawing events. In some examples, these particles may be microbeads, microparticles, micropellets, microwafers, paramagnetic beads, microparticles, paramagnetic microparticles, or the like. In embodiments, the particles contain one or more identifying features such as a bar code, a nickel bar code, an alphanumeric symbol, a color, a shape, or some combination of thereof, among other possibilities. Particle sizes may range from about 70×25×6 micrometers (μm) to about 80×30×6 μm and must be able to be withdrawn into the pipette tip.

Figure 1C:
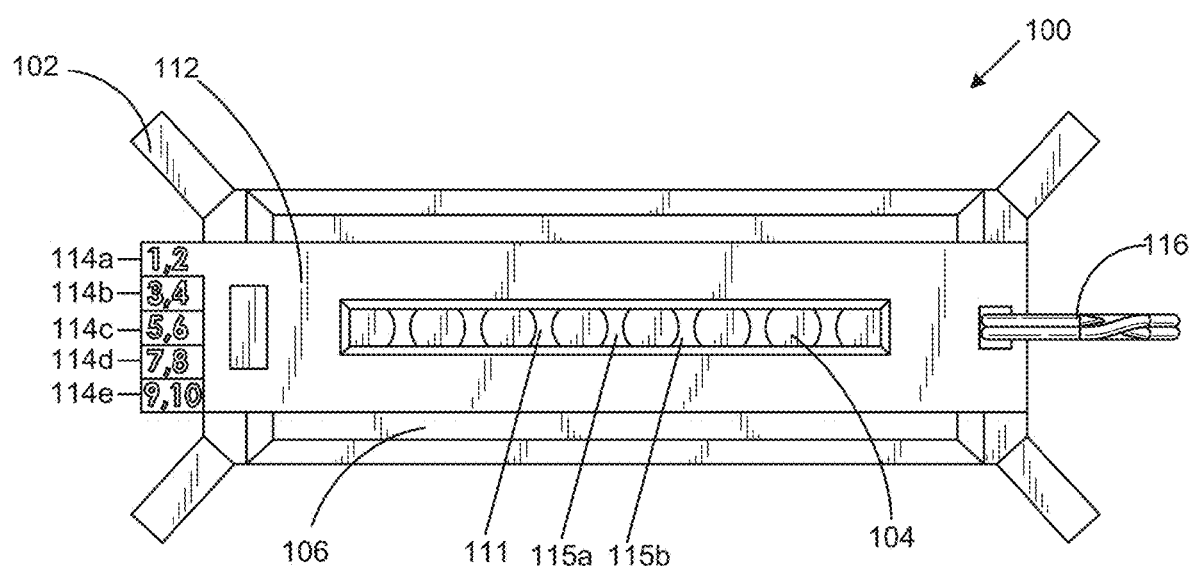
FIG. 1C illustrates a top view of the example pipette alignment device of FIG. 1A including an adjustable platform, according to an example embodiment.
Figure 1D:
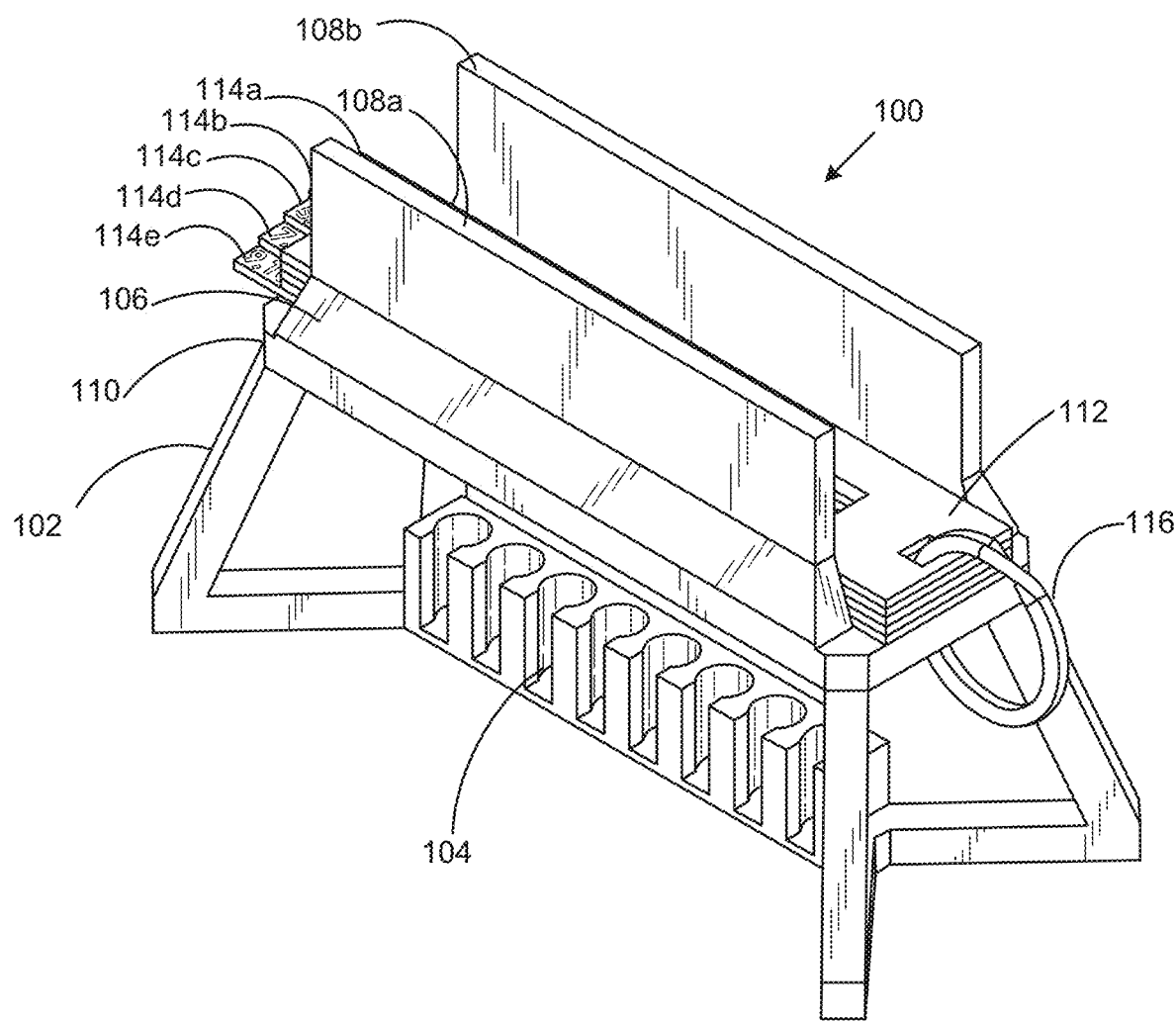
FIG. 1D illustrates an isometric view of the example pipette alignment device of FIG. 1C, according to an example embodiment.

FIGS. 1C-1D illustrate the example device 100 for aligning a pipette including an adjustable platform 112. The adjustable platform 112 is detachably associated with the support structure 106 in embodiments. In an example embodiment, the adjustable platform 112, in combination with the support structure 106 and the base 102, supports and positions a pipette such that a dispensing tip of the pipette is at a predetermined depth within a vial. The adjustable platform 112 aligns the position of a pipette such that the end of the pipette tip is at different predetermined depths within a vial during different withdrawing events. Additionally or alternatively, the support structure 106 and base 102 align the position of the pipette tip such that the end of the pipette tip is at the horizontal center of a vial in the vial receptacle 104.

The predetermined depths correspond to the parameters of a series of withdrawing events, such as the volume of solution within the vial during a withdrawing event. In particular, one or more predetermined depths of the end of the pipette tip in the solution correspond to the one or more volumes of solution withdrawn over a series of withdrawing events. As described above, it is often desirable to position the end of the pipette tip at or near the vertical center of the solution, as well as position the end of the pipette tip at or near the horizontal center of the solution. For example, the volume of solution will decrease after each withdrawing event and one or more predetermined depths correspond to the anticipated vertical center of the solution after a predetermined volume of solution is removed from the vial after each withdrawing event.

Each configuration of the adjustable platform 112 positions the withdrawing tip of the pipette at or near a consistent position within a solution, e.g., the vertical (and, potentially, horizontal) center of the solution during each of the corresponding withdrawing events. Positioning the withdrawing tip of the pipette at or near the center of the solution allows to provide consistent agitation of the solution, including any particles therein, which is desirable for testing.

In examples, the adjustable platform 112 includes a series of stackable cards. In these examples, the height of the adjustable platform 112 can be adjusted based on the number of stackable cards placed (i.e., stacked vertically) on top of the plate 110 of the support structure 106.

For example, the adjustable platform 112 can include a first stackable card 114a and a second stackable card 114b, each independently detachable from the adjustable platform 112. The first stackable card 114a can include a first opening 115a configured to receive a pipette tip and the second stackable card 114b can include a second opening 115b configured to receive the pipette tip.

In a first configuration, the first stackable card 114a and the second stackable card 114b are stacked vertically on the support structure 106 such that the first and second openings are approximately axially aligned (i.e., stacked on top of each other) for simultaneously receiving a pipette. In this example, the first and second openings of the first stackable card 114a and the second stackable card 114b are also approximately axially aligned with opening 111 of the plate 110, such that the plate 110 is also configured to simultaneously receive the pipette tip and/or part of the pipette shaft and/or both. In the first configuration, the combined thickness in the vertical direction of the first stackable card 114a (as further illustrated in FIG. 1H) and the second stackable card 114b position the end of the pipette tip is at a first predetermined depth within the vial.

This first predetermined depth corresponds to a first solution withdrawing event. In examples, the first predetermined depth can be determined based on the volume of solution within a vial. As noted above, it can be advantageous to have the end of the pipette tip at or near the vertical center of the solution within the vial.

As these withdrawing events are performed in a sequence, in examples, including those described in connection with FIGS. 3A and 3B, the pipette is configured to withdraw a predetermined volume of the solution from within the vial at the first predetermined depth and one or more subsequent actions may be taken. In embodiments, reducing the volume of the solution reduces the height of the top of the solution within the vial. Without being bound by theory, withdrawing a predetermined volume of the solution will lower the top of the solution to a first predetermined height in the vial. Knowing this predetermined height and/or withdrawing a predetermined volume may be beneficial for aligning the end of the pipette tip to at or near the vertical center in subsequent withdrawing events.

In embodiments, after the first withdrawing event, the first stackable card 114a can be removed from the adjustable platform 112 such that the adjustable platform 112 is in a second configuration without the first stackable card 114a. In the second configuration, the second stackable card 114b remains vertically stacked on the support structure 106 such that the opening aperture and the opening 111 of the plate 110 are approximately axially aligned (i.e., stacked on top of each other) for simultaneously receiving a pipette tip. In the second configuration, the thickness of the second stackable card 114b positions a pipette, such that the end of the pipette tip is at a second predetermined depth within the vial, as the thickness of the second stackable card 114b, alone, is less than the combined thickness of the first stackable card 114a and the second stackable card 114b. In embodiments, in the second configuration, the end of the pipette tip is closer to the bottom of the vial in the vertical direction, thereby positioning the end of the pipette tip at a different depth (e.g., a deeper depth) such that the end of the pipette tip is at the vertical center of the reduced volume of the solution based on the withdrawing event.

This second predetermined depth corresponds to a second solution withdrawing event. In examples, the second predetermined depth can be determined based on the volume of solution within a vial. As noted above, it can be advantageous to have the end of the pipette tip at or near the vertical center of the solution within the vial during each withdrawing event.

As these withdrawals and tests are performed in a sequence, in examples, the pipette is configured to withdraw a predetermined volume of the solution from within the vial at the second predetermined depth. Withdrawing a second predetermined volume reduces the top of the solution to a second predetermined height. This is beneficial for aligning the end of the pipette tip to at or near the vertical center in subsequent withdrawing events.

In another example, this process may be performed with additional stackable cards, for example those illustrated in FIGS. 1C-1D, including a third stackable card 110c, a fourth stackable card 110d, and a fifth stackable card 110e, each stackable card including a respective opening for receiving the pipette tip. In FIGS. 1C-1D, although five stackable cards are shown, it should be understood that the use of five stackable cards is merely an example, and any suitable number of stackable cards can be utilized. In this example, the first configuration of the adjustable platform 112 can include the respective opening of the first stackable card 114a, the second stackable card 114b, the third stackable card 114c, the fourth stackable card 114d, and the fifth stackable card 114e aligned (i.e., stacked on top of each other) with the opening 111 of the plate 110, such that the plate 110 supports stackable cards 114a-114e such that all of the openings can simultaneously receive the pipette tip. In this first configuration, the combined thickness of the stackable cards 114a-114e position a pipette, such that the end of the pipette tip is at a first predetermined depth within the vial, the first predetermined depth corresponding to a first withdrawing event.

Similar to the manner described above, as shown in the example embodiments illustrated in FIGS. 1A-1B, the first stackable card 114a is independently detachable from the adjustable platform 112. After the first withdrawing event, the first stackable card 114a can then be removed from the adjustable platform 112 such that the adjustable platform 112 is in a second configuration without the first stackable card 114a. In this second configuration, the respective openings of the second stackable card 114b, the third stackable card 114c, the fourth stackable card 114d, and the fifth stackable card 114e are aligned (i.e., stacked on top of each other) with the opening 111 of the plate 110, such that the plate 110 supports stackable cards 114b-114e. In this second configuration, the adjustable platform 112 positions a pipette, such that the end of the pipette tip is at a second predetermined depth within the vial, the second predetermined depth corresponding to a second withdrawing event.

This process can be repeated for each of the remaining stackable cards 110b-110e. For example, the second stackable card 110b can be removed such that the adjustable platform is in a third configuration. In the third configuration, the respective apertures of the third stackable card 110c, the fourth stackable card 110d, and the fifth stackable card 110e are approximately axially aligned with the opening 111 of the plate 110, such that the plate 110 supports stackable cards 114c-114e. Further, in the third configuration, the combined thickness of the third stackable card 114c, the fourth stackable card 114d, and the fifth stackable card 114e, position a pipette at a third predetermined depth within the vial corresponding to a third withdrawing event.

After the third withdrawing event, the third stackable card 114c can be removed to similarly position a pipette such that the end of the pipette tip is at a fourth predetermined depth within the vial corresponding to a fourth withdrawing event. The process of removing a stackable card for each withdrawing event to position an end of a pipette tip at a predetermined height within a vial can be repeated for the remaining stackable cards 114d-114e in the adjustable platform 112. Further, although the adjustable platform 112 shown in FIG. 1C includes five stackable cards, any number of stackable cards may be used, some or all of which may correspond to one or more withdrawing events.

The dimensions of the stackable cards 114a-114e may correspond to the predetermined volumes to be withdrawn over the series of withdrawing events. For example, in embodiments, the thicknesses of the stackable cards 114a-114e each correspond to a height of solution in the vials corresponding to a predetermined volume (e.g., 20 ml) to be withdrawn for each withdrawing event over the series of withdrawing events. In another example, the stackable cards 114a-114e may each correspond to a predetermined volume (e.g., 20 ml) to be withdrawn for more than withdrawing event over the series of withdrawing events.

For example, as shown in FIGS. 1A-1B, the first stackable card 114a and the second stackable card 114b may correspond to first and second withdrawing events, respectively, each of which may correspond to 20 ml of solution withdrawn after each withdrawing event, for a total of 40 ml over the first and second withdrawing events. In embodiments, the second stackable card 114b may correspond to third and fourth withdrawing events, each of which may also correspond to 20 ml of solution withdrawn after each withdrawing event, for a total of 40 ml over the first and second withdrawing events (the same as the first and second withdrawing events). Additionally or alternatively, the second stackable card 114b (and/or other stackable cards) may correspond to withdrawing events for amounts of solution that are different than one or more other stackable cards corresponding to other withdrawing events.

For example, a particular card (e.g., the first stackable card 114a) may correspond to withdrawing a first amount of solution (e.g., 20 ml of solution withdrawn for each of a first and second withdrawing event). In a further aspect, another card (e.g., the second stackable card 114b) may correspond to a second amount of solution that is different than the first amount of solution (e.g., 30 ml of solution withdrawn for each of a second and third withdrawing event).

In example embodiments, the stackable cards 114a-114e are joined by way of a fastening mechanism, such as ring 116. Ring 116 allows for simple and convenient removal of each of the stackable cards 114a-114e, which allows for independent detachability and re-attachability of the stackable cards. In embodiments, this detachability may improve additional functionality of the pipette alignment device 100. For example, ring 116 may allow for the addition or removal of one or more stackable cards from the adjustable platform 112. In examples, this addition and/or removal of stackable cards can add additional functionality to the device 100 by allowing for different configurations of the stackable cards. In examples, the ability to arrange and rearrange the stackable cards in different ordered combinations may result in adjusting the order and/or parameters of corresponding events (e.g., different pipette tip depths in solution corresponding to different withdrawing events).

For example, there may be more or fewer stackable cards than those illustrated in FIGS. 1C-1D, and those cards may have different characteristics than those illustrated in FIGS. 1C-1D (e.g., different thicknesses relative to each other, as well as the thicknesses illustrated in the Figures). In example, by detaching and reattaching the stackable cards, the device may accommodate any number of combination of stackable cards, some or all of which may correspond to various configurations of components described herein (e.g., various pipette configurations), as well methods for using these components (e.g., various pipette tip depths and/or withdrawing event configurations corresponding to different assays, solutions, particles, etc.).

In examples, the fastening mechanism may also secure the individual stackable cards to the device 100, thereby reducing the likelihood that one or more of the cards may be lost or out of order for one or more particular arrangements in connection with the device.

Other examples of fastening mechanisms are possible. For example, additional and/or alternative fastening mechanism may include one or more hinges, mechanical ties (e.g., disposable "zip ties"), and other types of fastening mechanisms.

In examples, the stackable cards 114a-114e each can include a label corresponding to at least one withdrawing event. In examples, each stackable card 114a-114e and the respective label corresponds to a single withdrawing event. In embodiments, each stackable card 114a-114e can correspond to more than one withdrawing events. In practice, withdrawing the predetermined volume may not displace the height of the top of the solution within the vial significantly. Accordingly, a tip of a pipette may be near enough to the vertical center of the solution for two or more consecutive withdrawing events to still effectively agitate the solution.

In example implementations, the adjustable platform 112 may be removed from the support structure 106 altogether, such that the support structure 106 alone supports a pipette.

In these examples, support structure 106 is configured to position a pipette, such that the end of the pipette tip is at a predetermined depth within a vial held by the vial receptacles 104. In practice, utilizing the support structure 106 without the adjustable platform 112 would likely be the last withdrawing event in the series of withdrawing events, as the pipette will be at the lowest depth within the vial in this instance.

Figure 1E:
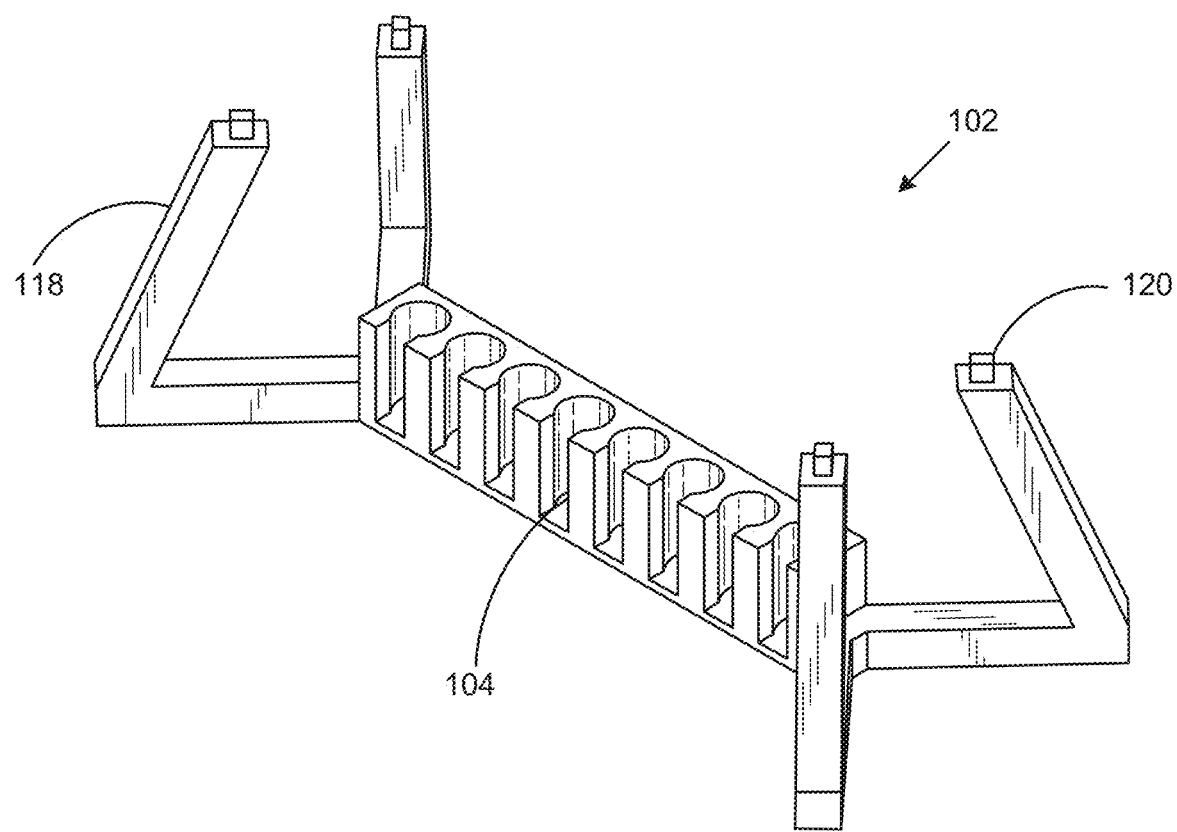
FIG. 1E illustrates an isometric view of an example base of the pipette alignment device of FIG. 1C, according to an example embodiment.

FIG. 1E shows the base 102 according to an example embodiment. As noted above, the base 102 includes vial receptacles 104, suitable for holding vials. In examples, the vial receptacles 104 are configured to hold vials which meet SBS or other industry standards. Similarly, the vial receptacles 104 are aligned to position the vials such that a standard pipette (for example, the pipette shown in FIG. 2) can be inserted and take withdrawals from each of the vials. In one embodiment, the vial receptacles are designed to space the vials similarly to standard SBS pipette tips.

In example embodiments, as shown in FIG. 1E, vial receptacles 104 can be designed to fully surround the vials, and may define circular shapes or the like. In embodiments, the vial receptacles 104 may also be made of and/or lined with one or more materials to increase the stability and/or positioning of the vials. In examples, the vial receptacles 104 may be lined with a rubber and/or foam that might allow the vials to restrict movement of the vials within the vial receptacles 104 when seated. Additionally, these materials lining the vial receptacles 104 may also absorb one or more mechanical actions (e.g., shaking) of the pipette or other components, thereby reducing transfer of the mechanical actions to the vials during withdrawing events. The vial receptacles 104 may be associated with a larger, multi-receptacle plate that may be removably inserted into the base 102.

Figure 1F:
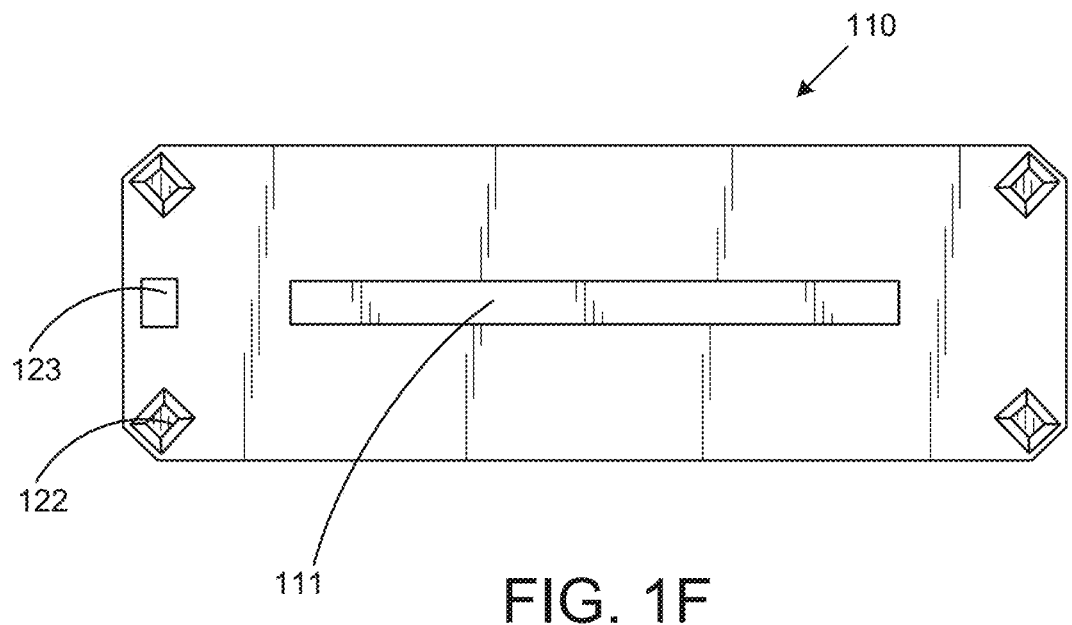
FIG. 1F illustrates a bottom view of a plate of an example support structure of the pipette alignment device of FIG. 1A, according to an example embodiment.

Now referring to FIGS. 1E-1F, in example embodiments, the base 102 includes one or more supports 118, which may include fastening mechanisms 120. The fastening mechanism or fastening mechanisms 120 are configured to mate with fastening mechanisms 122 on the support structure 106 and/or the plate 110. The fastening mechanisms 120 on the supports 118 allow for detachably associating the base 102 from the support structure 106 and/or the plate 110 via fastening mechanisms 122.

Additionally, the plate 110 can include an opening 123 to accommodate one or more fastening mechanisms (including the ring 116). Securing the ring 116 to the plate 110 and the adjustable platform 112 by way of the opening 123 may help align and stabilize the adjustable platform 112 to the support structure 106.

Figure 1G:
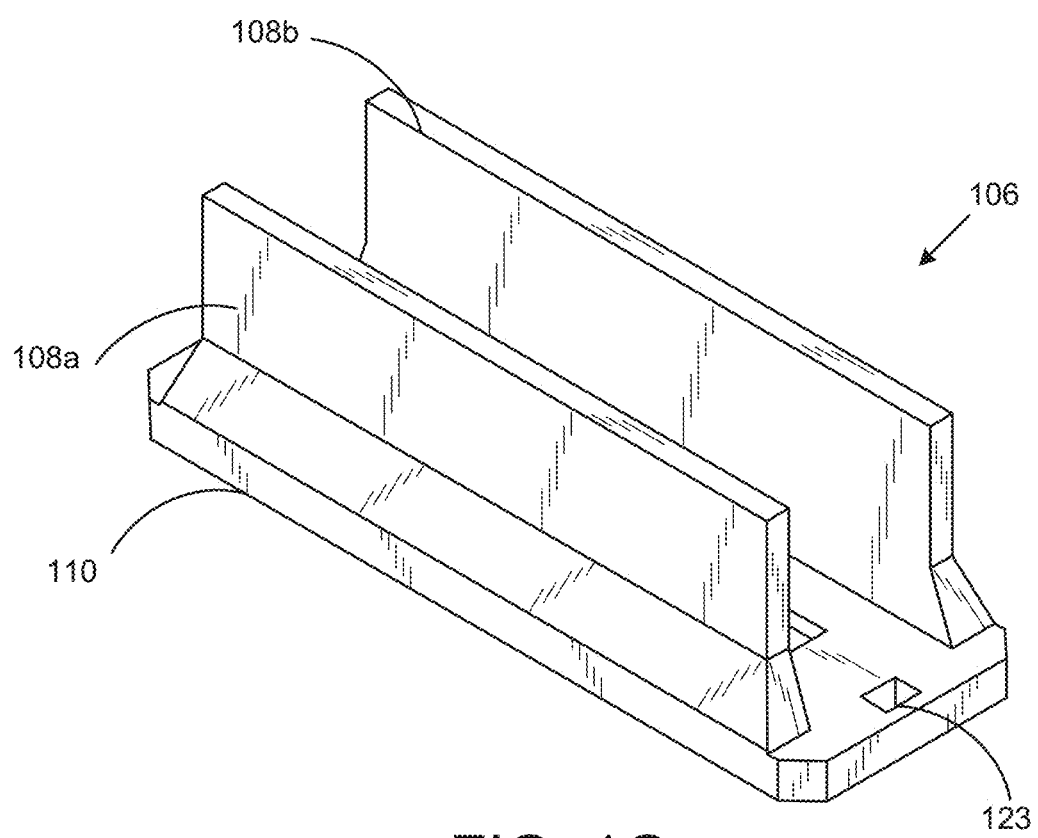
FIG. 1G illustrates an isometric view of the example support structure of FIG. 1F including sidewalls, according to an example embodiment.

FIG. 1G shows a support structure 106 in accordance with an example embodiment. As illustrated and described further herein, the support structure 106 includes the plate 110, the forward sidewall 108a, and the rearward sidewall 108b. The distance between the forward sidewall 108a and the rearward sidewall 108b can be wide enough to allow for a portion of a pipette to be positioned between the forward sidewall 108a and rearward sidewall 108b. The distance between the forward sidewall 108a and the rearward sidewall 108b can also be narrow enough to provide support and stability for a pipette. Additionally, the height of the forward sidewall 108a and the rearward sidewall 108b may also be high enough to help stabilize a pipette during a withdrawing event. Stability of a pipette during a withdrawing event helps to result in consistent particle counts across serial withdraws from the row of vials and between operators.

Figure 1H:
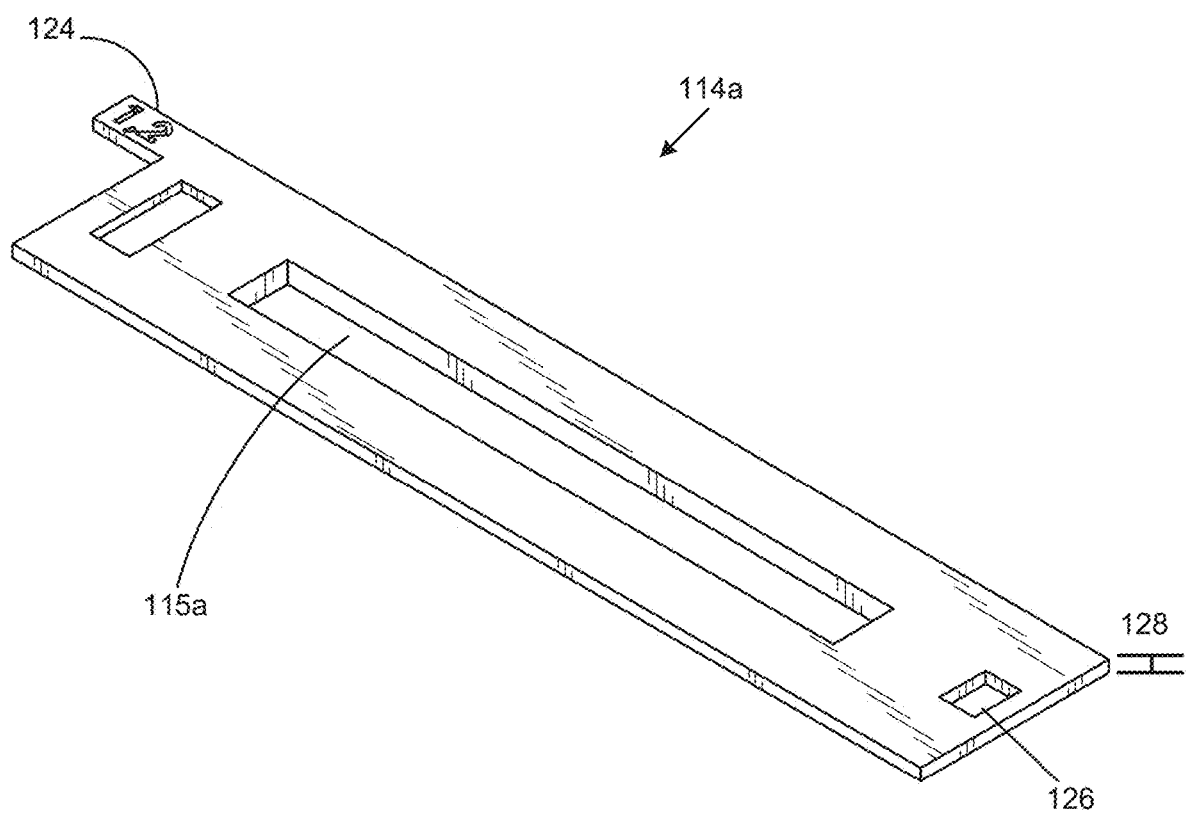
FIG. 1H illustrates an isometric view of an example stackable card of FIG. 1C, according to example embodiment.

Now referring to FIG. 1H, a stackable card 114a, according to an example embodiment. The stackable card 114a includes a label 124 corresponding to one or more withdrawing events. The stackable card 114a also includes opening 115a configured to partially or wholly surround and stabilize a pipette during a withdrawing event. Additionally, the stackable card 114a can include an additional opening 126 for receiving a fastening mechanism, such as ring 116. Additionally, as used in this disclosure, thickness 128 of the stackable card 114a is also illustrated in FIG. 1H.

Figure 1I:
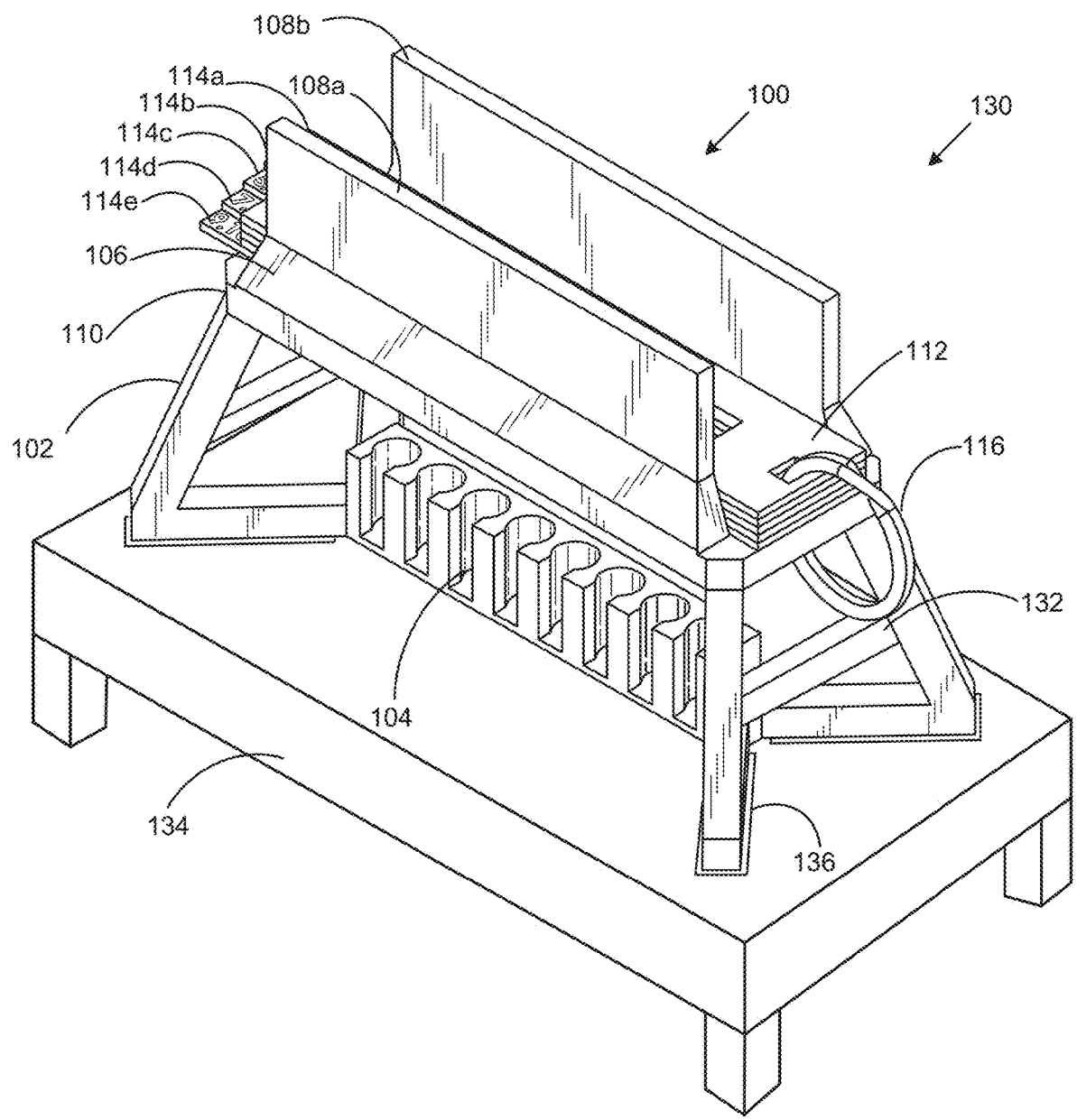
FIG. 1I illustrates an isometric view of an example pipette alignment device and stand, according to an example embodiment.

Referring now to FIG. 1I, FIG. 1I illustrates an example device 130 for aligning a pipette. In example embodiments, the device 130 includes pipette alignment device 100 (modified with base support bar 132) and a stand 134 coupled to a lower portion of the base 102 via adjustment interfaces 136. Like the components illustrated in FIGS. 1A-1H, the base 102 includes one or more vial receptacles 104 for receiving vials.

In an example embodiment, the device 130 aligns a pipette (for example, the pipette shown in FIG. 2) over vials (for example, the arrangement shown in FIGS. 4A-4B). Namely, the stand 134 and the base 102 support and align the position of a pipette such that the end of the pipette tip is at one or more predetermined depths within a vial during different withdrawing events. Additionally or alternatively, the stand 134 and base 102 align the position of the pipette tip such that the end of the pipette tip is at the horizontal center of a vial in the vial receptacle 104.

To do so, stand 134 may utilize adjustment interfaces 136, which interfaces with each lower portion of base 102, to adjust and/or align the position of one or more vials in relation to a pipette. In some examples, this position may be level to the surface on which device 130 is placed (e.g., a tabletop). In other examples, stand 134 may utilize adjustment interfaces 136 to angle the position of one or more vials in relation the surface on which device 130 is placed.

For example, stand 134 may utilize adjustment interfaces 136 to angle the position of one or more vials in relation the surface on which device 130 is placed at a particular angle (e.g., at an angle of 45 degrees relative to a plane defined by the tabletop). In a further aspect, positioning one or more vials at a particular angle in relation the surface on which device 130 is placed may beneficial for one or withdrawing events that occur while with the vials are held at the particular angle.

In other examples, stand 134 may utilize adjustment interfaces 136 to angle the position of one or more vials in relation the surface on which device 130 is placed over a series of angles, each of which may correspond to a particular angle. For example, in embodiments, the angle at which the vials are held relative to a tabletop can influence the position of particles within solutions within the vials, and can influence the manner in which the particles settle within the solution. For example, for a first withdrawing event the vials may be angled 45 degrees relative to a plane defined by the tabletop, and then for a second withdrawing event the vials may be angled 55 degrees relative to a plane defined by the tabletop. Other examples are possible.

For example, adjustment interfaces 136 may be arranged to more or less of the bottom portion of the base 102 than illustrated in FIG. 1I. In embodiments, the adjustment interfaces 136 may be molded into the base 102. In embodiments, the adjustment interfaces 136 integrate with the base 102, but may be detachably coupled to the base 102 to allow additional functionality. For example, in embodiments, device 100 may be detachably coupled to the stand 134 via adjustment interfaces 136 so that an operator might remove the device 100 from the stand 134. In examples, once removed, device 100 may also be moved (e.g., shaken) and/or inverted to further agitate the solution and/or particles contained in the vials. In examples, base support bar 132 might help facilitate this movement and/or inversion by allowing an operator hold the base support bar 132 in combination with one or more components of support structure 106 and/or adjustable platform 112 to ensure the components of device 100 are held together during the movement and/or inversion of the device 100.

In example embodiments, stand 134 may interact with one or more characteristics of the components of device 100, vials, solution, and/or particles, potentially over a series of solution preparation and/or withdrawing events. For example, for a solution containing particles having magnetic or paramagnetic properties, stand 134 may include a magnet, which may be used to secure the particles in one or more vials during one or more events. For example, this magnet may be used in stand 134 while a washing solution is dispersed into the vial and may improve the results of the washing portion (e.g., by ensuring that the assembled particles remain intact and in the vial during a vigorous washing event).

In some example embodiments, stand 134 may include a magnetic in a particular portion of stand 134, depending on the components of device 100, vials, solution, and/or particles with which the magnet may interacts. For example, a magnet may be place in the portion of stand 134 (i.e., a magnetic portion of stand of 134) directly under vial receptacles 104. In other examples, magnets may be place in the portion of stand 134 corresponding to adjustment interfaces 136, which may allow the base 102, if made from a magnetic material, to detachably couple to the stand 134. Other examples are possible.

In examples, although device 130 (including base support bar 132, stand 134, adjustment interfaces 136) has been described primarily in connection with the use of magnetic or paramagnetic particles, it should be readily understood that device 130 may be used with a variety of particles, including microbeads, microparticles, micropellets, microwafers, paramagnetic beads, microparticles containing one or more identifying features (such as a bar code, a color, and/or a shape), paramagnetic microparticles, paramagnetic microparticles containing one or more bar codes, and/or beads containing one or more nickel bar codes, or some combination of thereof, among other possibilities.

Figure 2:
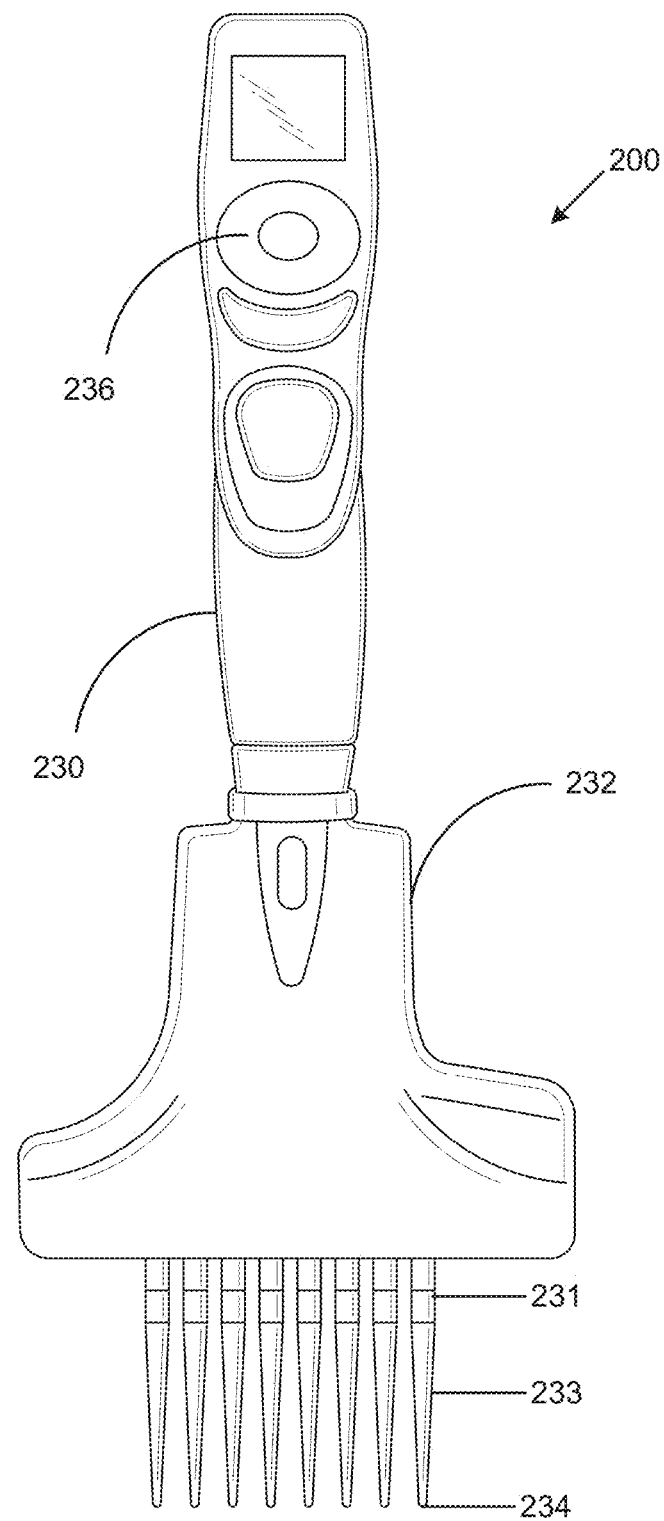
FIG. 2 illustrates a pipette assembly, according to an example embodiment.

Now referring to FIG. 2, a pipette assembly 200 is described according to an example embodiment. The pipette assembly 200 can include a handle 230, a pipette housing 232, a shaft 231, pipette tip 233, and an end of the pipette tip 234. In a further aspect, the pipette can also include one or more computing devices configured to control the withdrawing events described herein. To do so, the pipette may include various components, one or more processors, a data storage unit, a communication interface, and/or a user interface.

In examples, the handle can include a control 236 for controlling one or more aspects of a withdrawing event. For example, control 236 may control the agitation and/or withdrawing of the solution from the vial. In embodiments, control 236 may be include one or more manual controls that allow an operator to control one or more aspects of a withdrawing event (e.g., controls for agitation duration, intensity, etc., controls for withdrawing duration, volume, etc.). In other embodiments, control 236 may include one or more automated program instructions that allow an operator to engage one or more aspects of a withdrawing event and automatically execute one or more aspects of the withdrawing event thereafter (e.g., program instructions for engaging agitation for a predetermined duration then withdrawing a predetermined volume of the solution). In a further aspect, control 236 may use one or more processors to execute these program instructions, among other possibilities.

In example embodiments, the pipette assembly 200 is configured to withdraw a solution, such as a solution, from a vial in the vial receptacles 104 at one or more predetermined depths within the vial. Additionally or alternatively, the pipette may be configured to agitate a solution, such as a paramagnetic bead and/or polystyrene particle solution, in a vial at one or more predetermined depths within a vial in the vial receptacles 104. In examples, agitation can involve aspirating the solution. In other examples, agitation can involve rapidly withdrawing and dispensing solution.

During these withdrawing or agitating events, the pipette assembly 200 is supported and stabilized by the pipette alignment device 100. For example, the support structure 106 is configured to at least partially encompass the pipette housing 232 to stabilize the pipette assembly 200 during a withdrawing event.

Additionally, in example embodiments, the pipette assembly 200 is configured to withdraw a predetermined volume of solution from a vial. Withdrawing a predetermined volume of the solution allows for predictability of the volume of solution and corresponding vertical center for subsequent withdrawing events.

It should be noted that although the pipette alignment device 100 is configured to receive the pipette assembly 200 shown in FIG. 2, different embodiments are possible for compatibility with additional and/or different types or configurations of pipettes.

For example, FIGS. 3A-3B show an end of the pipette tip 234 and a vial 300 according to example embodiments and configurations. Namely, FIG. 3A illustrates an end of the pipette tip 234 at a first predetermined depth 302 within the vial 300. FIG. 3B illustrates the end of the pipette tip 234 at a second predetermined depth 310 within the vial 300.

In practice, the vial 300 contains a solution 304, which includes one or more particles 308. These particles may be utilized during one or more assay procedures after the solution 304 is withdrawn from the vial 300, including, for example, to identify a particular type and/or subset of particles within the solution.

The first predetermined depth 302 is determined based on the volume of the solution 304 within the vial 300 at or before first withdrawing event. As noted above, it may be desirable for the end of the pipette tip 234 to be at or near a vertical and/or horizontal center of the solution 304. The vertical center of the solution can be determined based on the size of the vial 300, the volume of solution 304, and/or the first height 306 of the solution 304 during or before the first withdrawing event.

The second predetermined depth 310 is determined based on the volume of the solution 304 within the vial 300 at or before a second withdrawing event. The vertical center of the solution can be determined based on the size of the vial 300, the volume of solution 304, and/or the second height 312 of the solution 304 during or before the second withdrawing event. In practice, the vertical center of the solution 304 during or before the second withdrawing event will be lower than before the first withdrawing event based on how much solution 304 is withdrawn during the first withdrawing event. Similarly, the first height 306 of the solution 304 is higher than the second height 312 of the solution 304 and the second predetermined depth 310 is typically deeper than the first predetermined depth 302.

As described above, the pipette alignment device 100 is configured to position the end of the pipette tip 234 at the first predetermined depth 302 when the adjustable platform 112 is in a first configuration. The pipette alignment device 100 is configured to position the end of the pipette tip 234 at the second predetermined depth 310 when the adjustable platform 112 is in a second configuration, different from the first configuration. Although two predetermined depths are shown in FIGS. 3A-3B, it should be understood that many other predetermined depths can be achieved based on various configurations of the support structure 106 and/or the adjustable platform 112. It should also be noted that although round particles are illustrated in FIGS. 3A-3B, it should be understood that different shapes, amounts, and/or types of particles may be used.

For example, FIGS. 3C-3D show the example embodiment of FIGS. 3A-3B, except the solution 304 includes paramagnetic beads 314. In example embodiments, each of the paramagnetic beads 314 includes a unique bar code. In another example, each of the paramagnetic beads 314 includes two or more unique bar codes.

In yet another example, a subset of the paramagnetic beads 314 may include one unique bar code and the remaining paramagnetic beads 314 may include two or more unique bar codes. In practice, each of these bar codes may correspond to particular information about the paramagnetic bead, the solution, and/or one or more additional parameters (including those used in an assay). For example, these unique bar codes may be utilized during one or more assay procedures after the solution 304 is withdrawn from the vial 300, including, for example, to identify a particular type and/or subset of paramagnetic beads within the solution.

Like FIGS. 3A-3B, although two predetermined depths are shown in FIGS. 3C-3D, it should be understood that many other predetermined depths can be achieved based on various configurations of the support structure 106 and/or the adjustable platform 112.

Now referring to FIGS. 4A-4B, example embodiments are shown, illustrating the interfacing of a pipette alignment device 100 (see example illustrated in FIGS. 1A-1H) and pipette assembly 200 (see example illustrated in FIG. 2). In examples, the pipette alignment device 100 is configured to receive the pipette assembly 200. As shown in FIG. 4A, the support structure 106 is configured to receive and stabilize the pipette assembly 200 during withdrawing events. In embodiments, one or more portions of the pipette assembly 200 (e.g. pipette housing 232) contacts one or more of the sidewalls of the pipette alignment device, thereby stabilizing and aligning the pipette assembly 200 in relation to the pipette alignment device 100. In examples, this alignment and stabilization of the pipette assembly 200 and the pipette alignment device 100 also stabilizes and/or aligns components of the pipette assembly 200 in relation to the pipette alignment device 100 (e.g., stabilizing and/or aligning the end of the pipette tip 234 in relation to the vial 300). As shown in FIG. 4A, in examples, this combination of the pipette assembly 200 and the pipette alignment device 100 also sets the end of the pipette tip 234 at a predetermined depth within vial 300, thereby preventing further or variable depth insertion of the end of the pipette tip into the vials.

Similar to FIG. 4A, in embodiments, as shown in FIG. 4B, the support structure 106 in combination with the adjustable platform 112 are also configured to receive and stabilize the pipette during withdrawing events. Further, as shown in FIG. 4B, the adjustable platform 112 can be adjusted modify the position of the pipette assembly 200 and the depth of the end of the pipette tip 234 within the vial 300.

It should be noted that although FIGS. 4A-4B illustrate a pipette assembly 200 with eight pipette tips 233 and a pipette alignment device 100 with eight corresponding vial receptacles and vial 300, a number of configurations are possible. For example, some example SBS standard pipettes include between one and twelve pipette tips. As such, in example embodiments, a pipette alignment device 100 can be configured with between one and twelve vial receptacles.

In a further aspect, although one pipette depth is illustrated in FIGS. 4A-4B, it should be understood that the pipette alignment device 100 may be used to align and set the end of the pipette tip 234 over a range of predetermined depths within the vials 300 (e.g., using the various settings of the adjustable platform 112), as shown in, at least FIGS. 1A-1B and 3A-3D, described herein.

It should also be noted that, as illustrated in FIGS. 4A-4B, pipette alignment device 100 may be used to align and set the pipette tip 233 and/or the end of the pipette tip 234 at a particular position relative to the vial 300. For example, the pipette alignment device 100 may be used to align and set the pipette tip 233 and/or the end of the pipette tip 234 at a particular horizontal position relative to the vial 300, wherein the term "horizontal" indicates a direction transverse to the vertical direction of the vial, and extending outward from a vertical centerline of the vial (e.g., the horizontal center of the vial 300 stabilized in one position in the vial receptacles of pipette alignment device 100).

In a further aspect, to evaluate the efficacy of preparing, homogenizing, and/or counting the particles in a solution containing a plurality of particles one or more of the example embodiments described above, one or more devices, systems, or methods may be employed.

For example, if particles in a solution are not even distributed throughout the solution prior to a withdrawing event (e.g. because of clumping, binding/settling on the bottom or sides of the vessel in which the solution containing the particles is prepared, etc.), the particles may remain in the vessel as solution is pipetted out of the vessel. To help measure the dispersion and consistency of particles in a solution, a sample of the solution may be transferred onto a surface (e.g., a Petri dish, a well, or the like) and a composite image of the transferred sample of solution may be generated. In examples, this composite image may contain a plurality of images of the transferred sample of solution and based on one or more attributes of this generated composite image, one or more parameters may be determined for the transferred sample of solution.

In FIGS. 5A-5E, a sample of solution 502 containing particles is illustrated according to an example embodiment. These particles may be utilized during one or more assay procedures, including, for example, to identify a particular type and/or subset of components within a sample. In the example embodiment illustrated in FIGS. 5A-5E, the solution 502 includes paramagnetic beads 504. In some example embodiments, each of the paramagnetic beads 504 includes a unique identifier, such as a bar code. In another example, each of the paramagnetic beads 504 includes two or more unique identifiers, such as bar codes.

In yet another example, a subset of the paramagnetic beads 504 may include one unique bar code and the remaining paramagnetic beads 504 may include two or more unique bar codes. In practice, each of these bar codes may correspond to particular information about the paramagnetic bead, the solution, and/or one or more additional parameters (including those used in an assay). For example, these unique bar codes may be utilized during one or more assay procedures to identify a particular type and/or subset of paramagnetic beads within the solution.

It should also be noted that although the particles illustrated in FIGS. 5A-5E involve paramagnetic beads, different shapes, amounts, and/or types of particles may be used.

It should also be noted that one or more concepts illustrated in FIGS. 5A-5E may be accomplished using a computing device, such as computing device 500. Referring now to the figures, FIG. 5 is a simplified block diagram of an example computing device 500 of a system. Computing device 500 can perform various acts and/or functions, such as those described in this disclosure. Computing device 500 can include various components, such as processor, data storage unit, communication interface, and/or user interface, illustrated in FIG. 5A. These components can be connected to each other (or to another device, system, or other entity) via connection mechanism (illustrated as the connecting lines between processor, data storage unit, communication interface, and/or user interface, illustrated in FIG. 5A).

A processor can include a general-purpose processor (e.g., a microprocessor) and/or a special-purpose processor (e.g., a digital signal processor (DSP)).

A data storage unit can include one or more volatile, non-volatile, removable, and/or non-removable storage components, such as magnetic, optical, or flash storage, and/or can be integrated in whole or in part with the illustrated processor. Further, the data storage unit can take the form of a non-transitory computer-readable storage medium, having stored thereon program instructions (e.g., compiled or non-compiled program logic and/or machine code) that, when executed by the processor, cause computing device 500 to perform one or more acts and/or functions, such as those described in this disclosure. As such, computing device 500 can be configured to perform one or more acts and/or functions, such as those described in this disclosure. Such program instructions can define and/or be part of a discrete software application. In some instances, computing device 500 can execute program instructions in response to receiving an input, such as from the communication interface and/or user interface. The data storage unit can also store other types of data, such as those types described in this disclosure.

The communication interface can allow computing device 500 to connect to and/or communicate with another other entity according to one or more protocols. In one example, the communication interface can be a wired interface, such as an Ethernet interface or a high-definition serial-digital-interface (HD-SDI). In another example, the communication interface can be a wireless interface, such as a cellular or WI FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

The user interface can facilitate interaction between computing device 500 and a user of computing device 500, if applicable. As such, the user interface can include input components such as a keyboard, a keypad, a mouse, a touch sensitive panel, a microphone, a camera, and/or a movement sensor, all of which can be used to obtain data indicative of an environment of computing device 500, and/or output components such as a display device (which, for example, can be combined with a touch sensitive panel), a sound speaker, and/or a haptic feedback system. More generally, a user interface can include hardware and/or software components that facilitate interaction between computing device 500 and the user of the computing device 500.

Computing device 500 can take various forms, such as a workstation terminal, a desktop computer, a laptop, a tablet, a mobile phone, or a controller. In a further aspect, when computing device 500 is implemented as a controller, a user of the controller can use the controller to control the capturing of one or more images of the solution, as well as process the plurality of images to generate and/or annotate a composite image of the plurality of images. In examples, the controller can execute a program that causes the controller and/or components operating therewith (e.g., a camera) to perform a series of actions by way of a non-transitory computer-readable medium having stored program instructions.

Figure 5A:
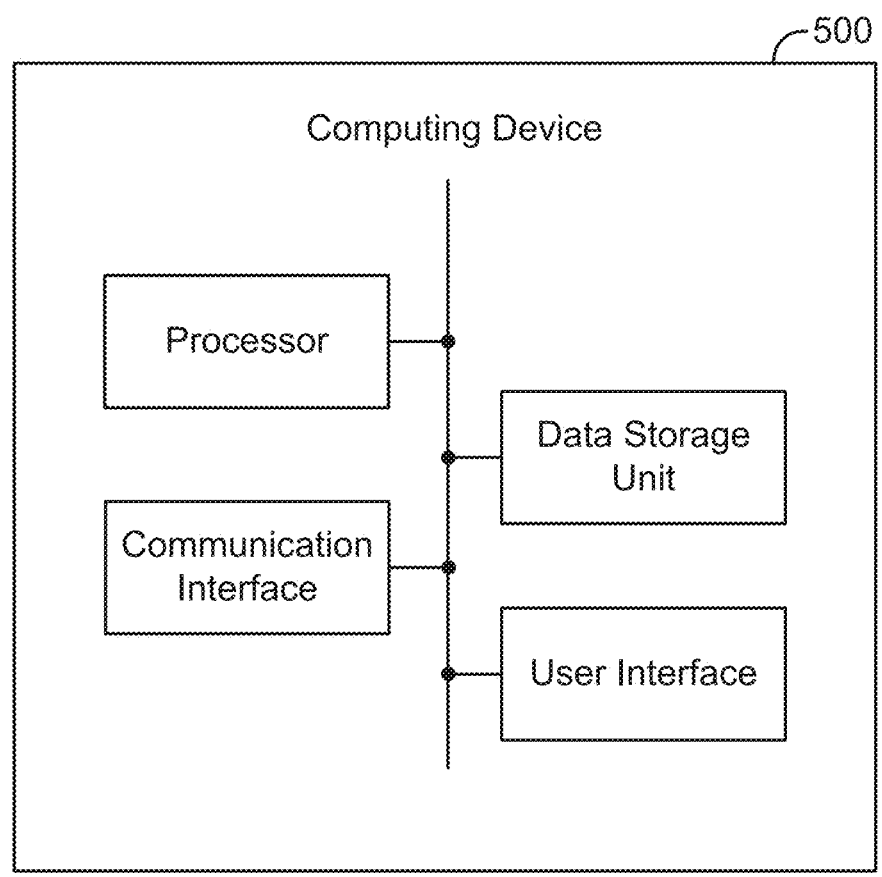
FIG. 5A illustrates a simplified block diagram of an example computing device, according to an example embodiment.
Figure 5B:
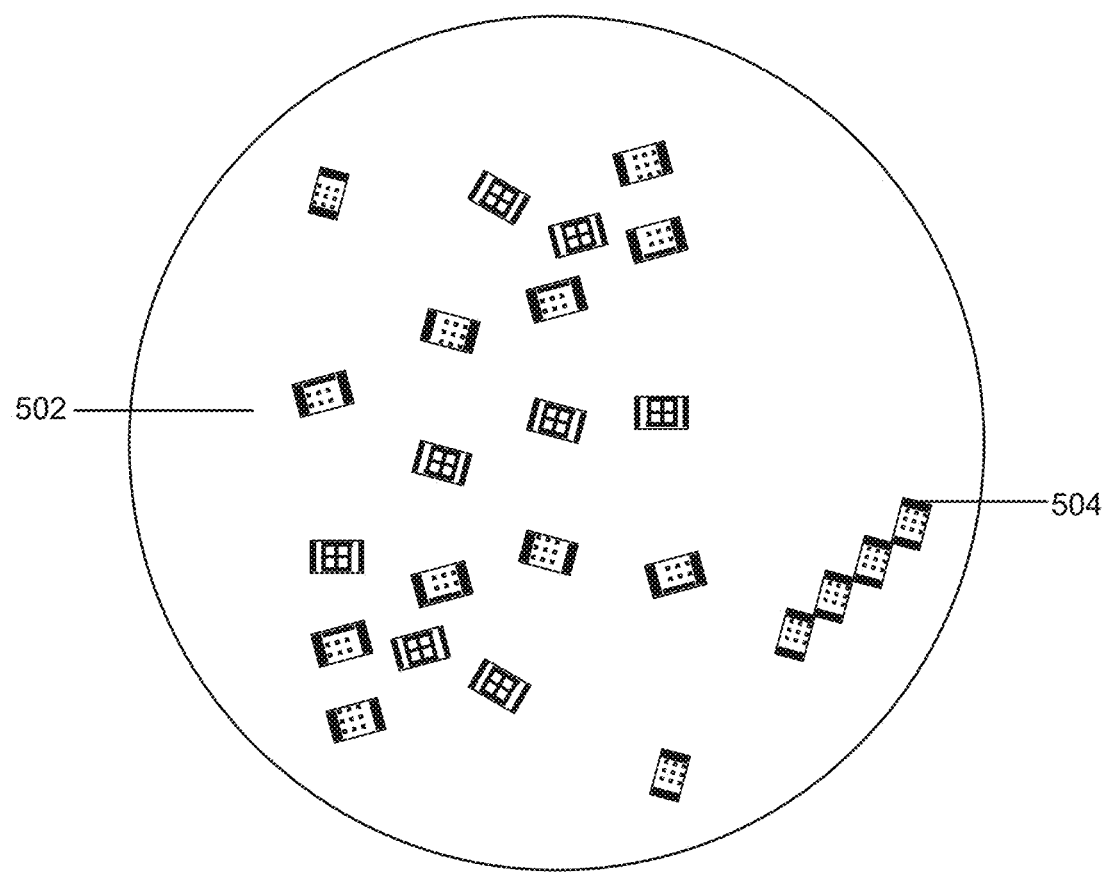
FIG. 5B illustrates a sample of prepared solution containing particles according to an example embodiment.
Figure 5C:
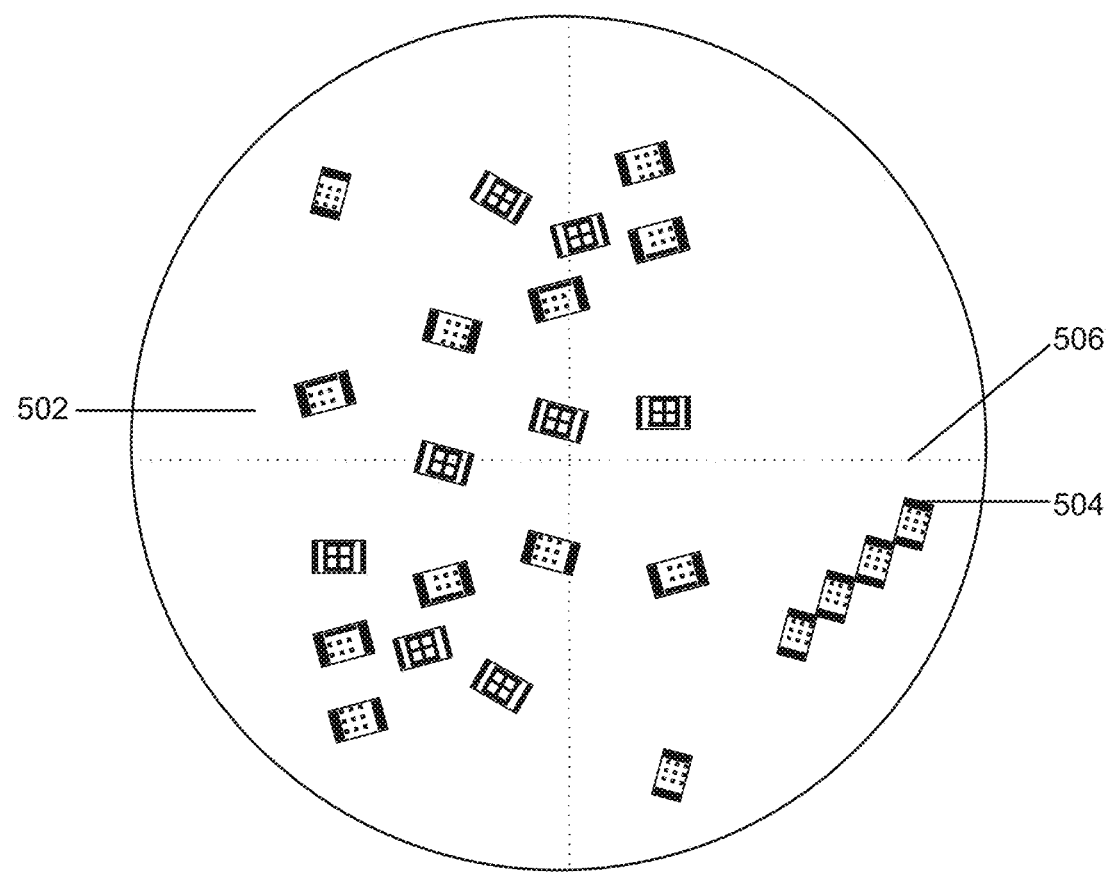
FIG. 5C illustrates an image of the sample of prepared solution containing particles of FIG. 5B, according to an example embodiment.

In FIG. 5B, a sample of the prepared solution transferred onto a surface is illustrated, wherein the prepared solution comprises the first volume of buffer solution and the plurality of particles. Turning to FIG. 5C, an example segmentation 506 of the surface is illustrated, in which the surface has been divided into four quadrants for imaging. In example embodiments, segmentation of the illustrated surface may include different sizes, shapes, numbers, and configurations of segments to be imaged for the transferred solution, depending on one or more characteristics of the sample (e.g., size, particle concentration, etc.) and/or the image analysis to be undertaken. Once the segmentation 506, one or more images may be captured for each of the one or more segments and used for further processing.

Figure 5D:
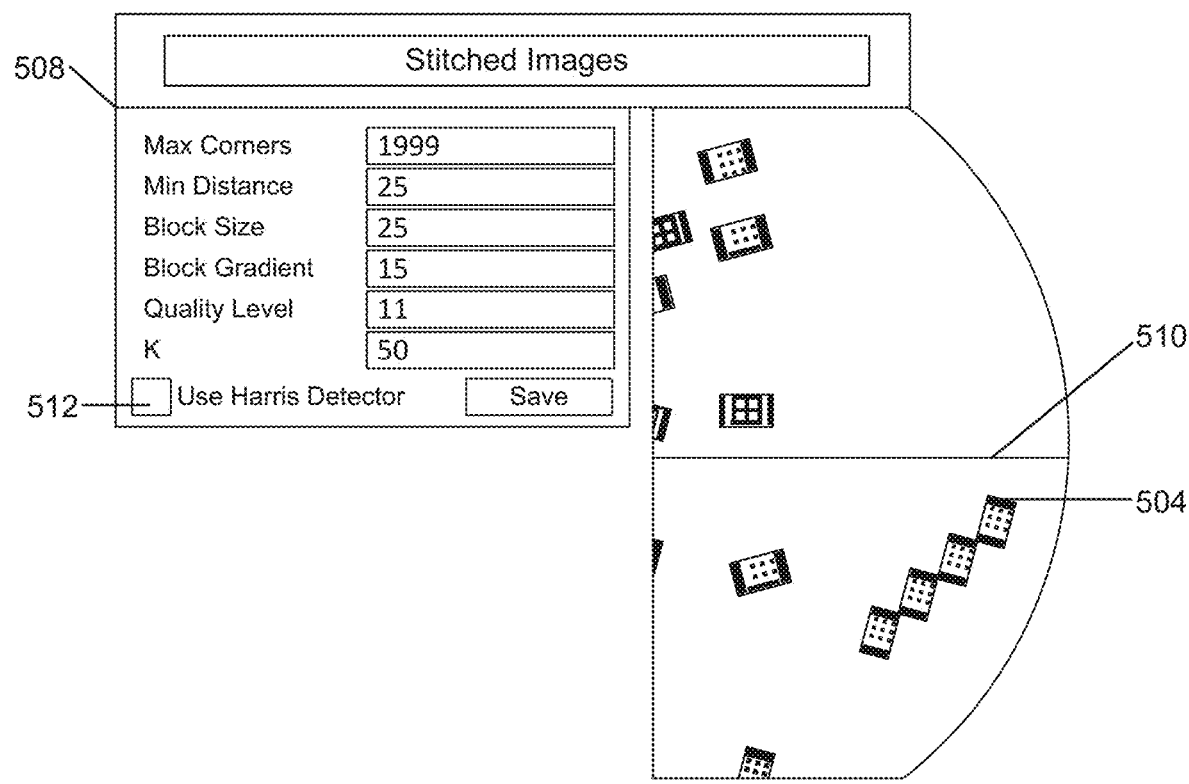
FIG. 5D illustrates a composite image of the sample of solution containing particles of FIGS. 5B and 5C and an associated graphical user interface, according to an example embodiment.

Turning to FIG. 5D, an example composite image 510 of a plurality of images captured across one or more segments of the solution is illustrated. In example embodiments, composite image 510 may be generated by stitching the plurality of images of the transferred sample of prepared solution into the composite image of the transferred sample of solution illustrated in FIG. 5D. In example embodiments, a controller may stich together the plurality of images of the transferred sample of solution that contain particles and remove any images that do not contain particles. In example embodiments, the controller may determine which images in the plurality of images of the transferred sample of solution that contain particles by performing one or more of a pixel density and/or gradient analysis of the individual images captured by the controller. In some example embodiments, the particles in the solution (e.g., paramagnetic beads 504) may present a different contrast and/or pixel density compared the solution in which the particles are disposed (shown in FIGS. 5B-5E as the dark, black portions of paramagnetic beads 504 compared to the light, white portions of the surround solution 502). Prior to stitching, as illustrated in the example graphical user interface 508 of FIG. 5D, a user may set one or more parameters for the stitching protocol, including which images should be stitched together, as well as one or more attributes of the stitched image and/or stitching protocol (shown in FIG. 5D as "Max Corners," "Min Distance," "Block Size," "Block Gradient," "K"). Other examples are possible.

Once composite image 510 has been generated, further analysis may be undertaken on the composite image 510 to determine one or more parameters of the transferred sample of prepared solution and/or the particles contained therein. In example embodiments, as shown in the example graphical user interface 508 of FIG. 5D, a user may want to determine one or more attributes of the solution, including a count of the particles in the transferred sample. To do so, the user may select to use one or more programs executing a variety of automated protocols, including one or more edge detection protocols. In an example embodiment, as illustrated in FIG. 5D, a user may select to use a Harris corner detection algorithm (shown in FIG. 5D as "Use Harris Detector" prompt 512) to perform this edge detection for the particles in the solution and thereby generate a count of the particles in the solution. In example embodiments, the controller may use one or more algorithms (including Harris corner detection) and/or protocols to detect an edge of a particle in the composite image, based at least in part on detecting an edge of the particle in the composite image, determining a presence of at least one particle in the composite image. Other examples, including the use of other image processing and/or machine learning and artificial intelligence algorithms, are possible. For example, one or more machine learning models may comprise a deep learning model and/or image pixel and/or gradient analysis models.

Figure 5E:
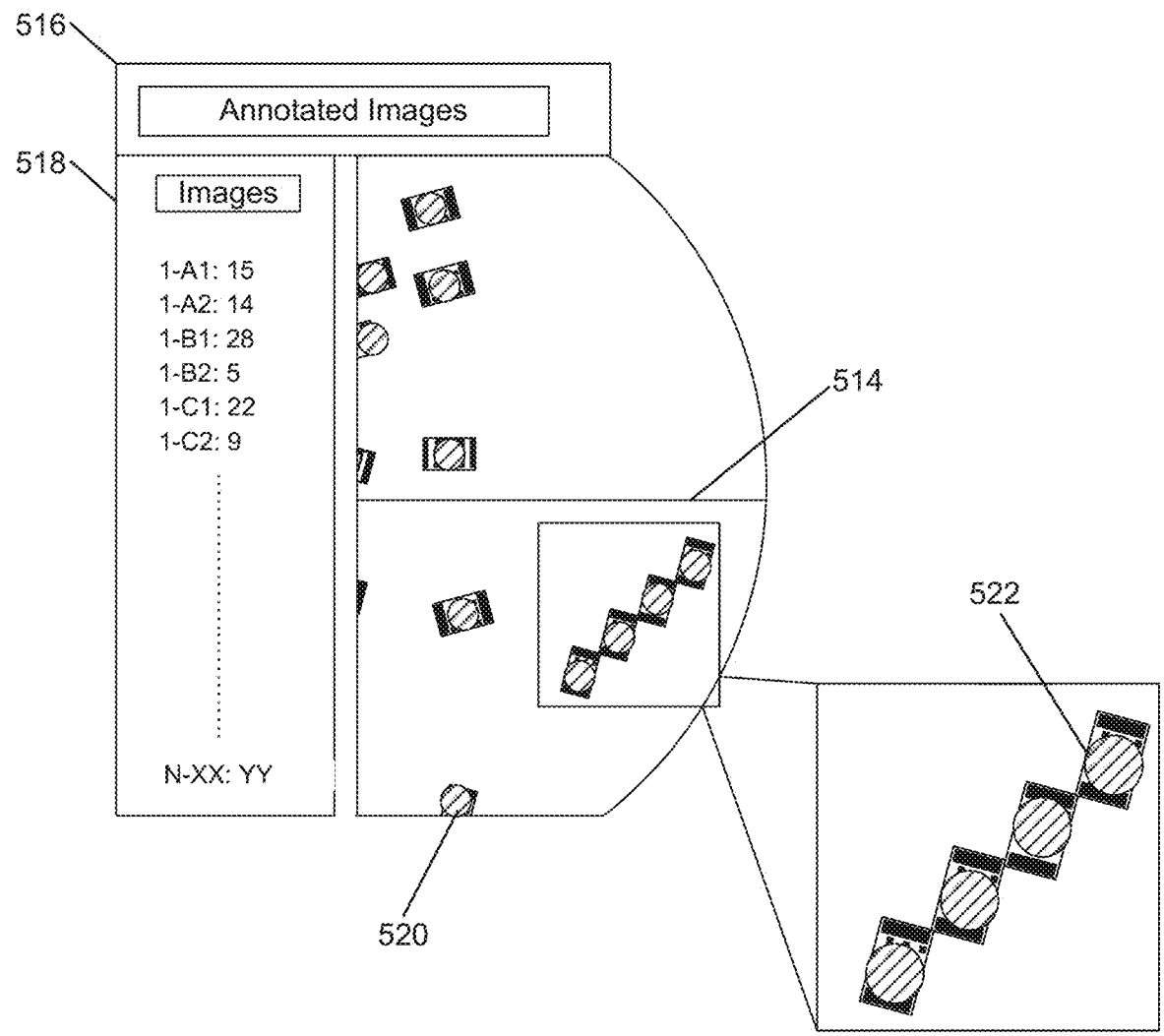
FIG. 5E illustrates an annotated version of the composite image of FIG. 5D and an associated graphical user interface, according to an example embodiment.

Turning to FIG. 5E, an example annotated image 514 of a plurality of particles detected in the composite image 510 is illustrated. In example embodiments, the controller may determine the count of the particles in solution by identifying the particles in the solution and generate annotated image 514 by utilizing one or more edge detection protocols (including the Harris corner detection algorithm). In example embodiments, the controller may perform this edge detection for the particles in the solution, generate a count of the particles in the solution, and present annotated images of the particles identified and/or counted in the annotated image 514. For example, as shown in example graphical user interface 516 of FIG. 5E, in example embodiments, the controller may present the user with an image accounting 518 of all of the images that were stitched together and/or annotated, as well as one or more attributes of the stitched image and/or stitching protocol (e.g., how many particles were identified in each image and/or segment of sample and/or corresponding images). Other examples are possible.

Once annotated image 514 has been generated, further actions may be undertaken on the annotated image 514 to further inform a user of the controller of one or more parameters of the transferred aliquot of prepared solution and/or the particles contained therein. In example embodiments, as shown in the example graphical user interface of FIG. 5E, a user may be presented with an annotated version of a single particle 520 in the solution, as well an annotated version of a multiple particles 522 that may be overlapping and/or joined together in the solution. In example embodiments, the user may select to generate one or more additional annotated images and/or graphical user interfaces based on the annotated image 514, including total particle counts in the sample, the types of particles in the sample, and the extent of overlapping particles in the sample.

These example graphical user interfaces are merely for purposes of illustration. The features described herein may involve graphical user interfaces that are configured or formatted differently, include more or less information and/or additional or fewer instructions, include different types of information and/or instructions, and relate to one another in different ways.

EXAMPLES

To illustrate the example embodiments described above, several sample solutions were prepared and tested to measure the efficacy of the mixing location of the pipette within the vial and utilizing a pipette alignment device. Further details are provided below.

Example 1

Mixing Location

In an example experiment, an 8-tip Integra® pipette was used to aspirate and withdraw a paramagnetic bead solution several times at three different depths within eight vials. In example embodiments, these solutions may utilize a proprietary solution, a Phosphate Buffered Saline with Tween solution (PBS-T), some combination of the two, or other solutions. Additionally or alternatively, these solutions may also include a mixture of particles (e.g., bar coded magnetic beads) with a variety of different attributes (e.g., all bar coded magnetic beads may comprise a single bar code or a mix bar codes).

In Example 1, this solution included bar coded paramagnetic beads in a PBS-Tween BSA solution using Canine Serology and Canine Fecal samples, but could also be used in other types of antigen and/or antibody capture assays. This paramagnetic bead solution within eight 2 mL vials were aspirated and withdrawn with the pipette tip near the top of the solution. An immunoassay was then conducted for each withdrawing event to determine the paramagnetic bead count of the withdrawn solution. To do so, the paramagnetic bead solution was dispensed into ninety six plate wells containing water and read.

Magnetic bead solutions within eight 2 mL vials were then aspirated and withdrawn with the pipette tip near the center of the solution. An assay was conducted for each withdrawing event to determine the paramagnetic bead count of the withdrawn solution.

Thereafter, the paramagnetic bead solutions within eight 2 mL vials were then aspirated and withdrawn with the pipette tip near the bottom of the solution. An assay was conducted for each withdrawing event to determine the paramagnetic bead count of the withdrawn solution.

Figure 6A:
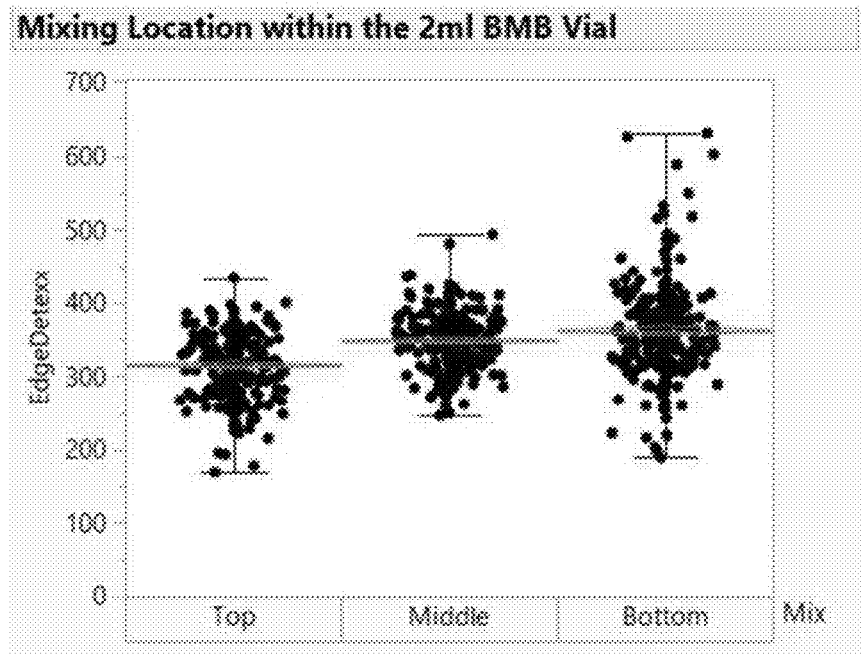
FIG. 6A illustrates paramagnetic bead count assay results at varying depths within a vial.
Figure 6B:
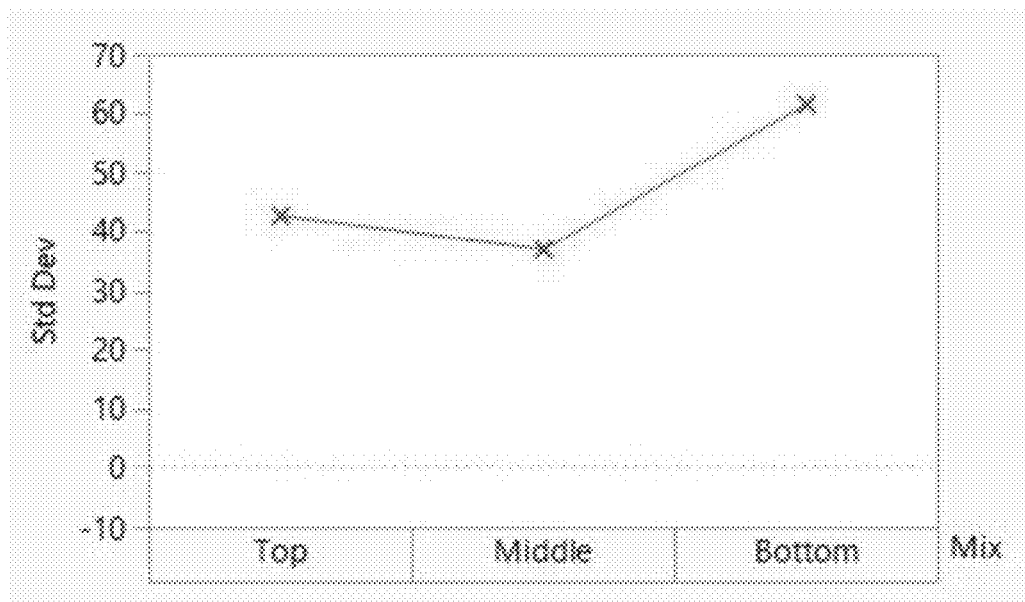
FIG. 6B illustrates standard deviation of paramagnetic bead count assay results at varying depths within a vial.

FIGS. 6A-6B show the results of this experiment. Namely, FIG. 6A shows the paramagnetic bead count results over the series of withdrawing events over different portions of the solution. FIG. 6B shows the standard deviation results of the results illustrated in FIG. 6A.

As shown in FIGS. 6A-6B: (i) mixing within the top of the solution resulted in the lowest paramagnetic bead count of the three portions of the solution; (ii) mixing within the bottom of the solution resulted in a high standard deviation across the plate; and (iii) mixing within at or near the middle of the solution delivered a high paramagnetic bead count per withdrawing event and low variability (i.e., high consistency and with low standard deviation) across the plate.

Furthermore, although the experiment in Example 1 describes particular components and tests utilized according to specific parameters, it should be understood that the claimed devices and/or methods may be implemented in a variety of scenarios, including scenarios other than the assays described herein. For example, claimed devices and/or methods may be implemented in any situation where there is a need to pipette a consistently homogenous solution.

Example 2

Pipette Alignment Device

In another example experiment, five laboratory technicians ("operators") utilized a 8 channel Integra® pipette to aspirate and withdraw paramagnetic bead solution from eight 2 mL vials: (i) manually (without the use of the pipette alignment device described herein); and (ii) using the pipette alignment device.

Figure 6C:
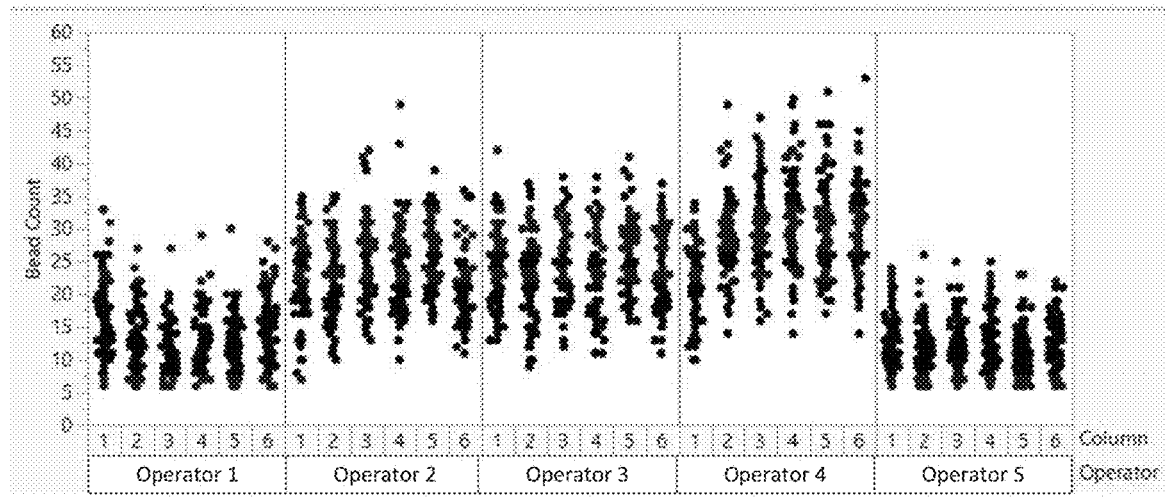
FIG. 6C illustrates assay results without use of a pipette alignment device.
Figure 6D:
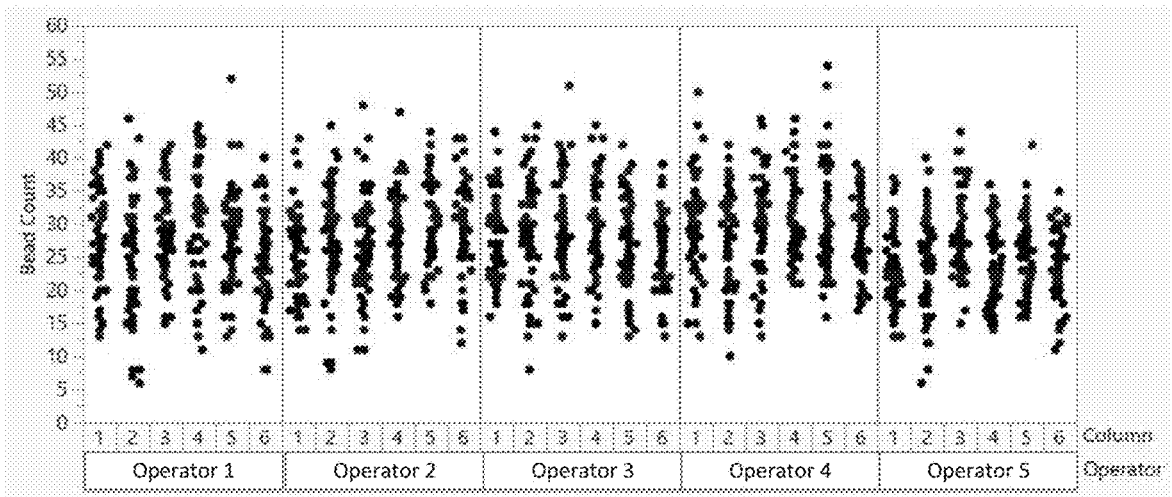
FIG. 6D illustrates assay results with use of a pipette alignment device.
Figure 6E:
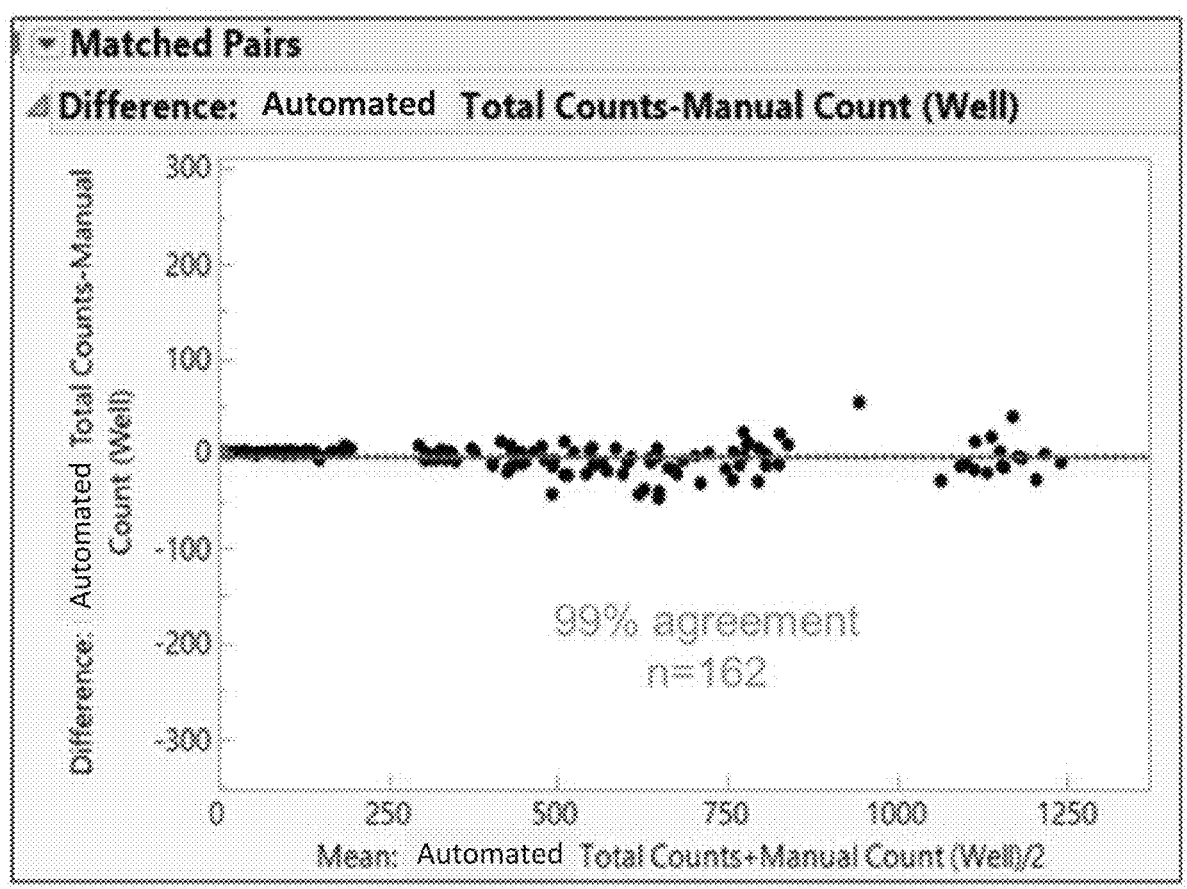
FIG. 6E illustrates particle count readings using an automated counting program compared to a manual counting protocol after a solution is prepared and an associated graphical user interface according to an example embodiment.

Namely, FIG. 6C shows bead count results without utilizing the pipette alignment device 100 and FIG. 6D shows bead count results utilizing the pipette alignment device 100. Both FIGS. 6C and 6D show the series of results from five different operators across five different columns. It should be noted that the columns refer to different heights within the vial in these figures. Each data point corresponds to a different withdrawing event. Bead count is shown along the y-axis.

In FIG. 6C, experimental results illustrated a higher variability of the bead count between the five operators in the experiment without utilizing the pipette alignment device 100 compared to when the pipette alignment device 100 was utilized during withdrawing events.

For example, as shown in FIG. 6D, using pipette alignment device 100 resulted in less variation between operators. The paramagnetic bead count results among samples withdrawn were more consistent between all five of the operators (using the pipette alignment device described herein) as compared to the results shown in FIG. 6C (without using the pipette alignment device described herein). Further, the paramagnetic bead count results operators were consistently higher than those shown in FIG. 6C.

In practice, the pipette alignment device can also reduce ergonomic and/or operator fatigue issues by holding the pipette during withdrawing, mixing, and/or aspiration. Further, the pipette alignment device eliminates the need for an operator to check that the pipette tips are mixing in the at or near the horizontal center line of the vial (as the pipette tips may be positioned at a particular predetermined depth within the vials).

Furthermore, although the experiment in Example 2 describes particular components and tests utilized according to specific parameters, it should be understood that the claimed devices and/or methods may be implemented in a variety of scenarios, including scenarios other than the assays described herein. For example, claimed devices and/or methods may be implemented in any situation where there is a need to pipette a consistently homogenous solution.

Example 3

Automated Bead Count

In an example experiment, using the devices, systems, or methods of FIGS. 5A-5E, a controller and associated program instructions to determine the accuracy of an automated bead counting protocol and compare it to a manual bead counting protocol. In the first portion of the experiment, an automated bead counting protocol was used to capture, stich, and analyze images of the sample solution to determine the total number (counts) of particles in the solution sample contained in a well (a Petri dish). In a second portion of the example experiment, the sample solution was analyzed manually by an operator to determine the total number (counts) of particles in the solution sample contained in a well (a Petri dish), by manually counting the particles in the captured images. After the first and second portions of the experiment, the counts were compared to determine an agreement between the automated and manual bead counting protocols.

FIG. 6C shows the results of this experiment. Namely, FIG. 6C shows 99% agreement between the automated and manual bead counting protocols.

Additionally, utilizing automated bead counting protocols improved bead count consistency across image analysis, it also saves time in the overall bead counting protocol and solution preparation procedure, as well as ensures more consistent results in the solution preparation procedure. For example, because a user may efficiently and consistently test one or more parameters of the prepared solution (e.g., bead counts in representative samples of the prepared solution), the may user to increase the throughput (whether in an automated or manual procedure) and consistency of prepared solution, resulting in time and cost savings, as well as improved results, for the solution preparation (and assay) procedure.

Furthermore, although the experiment in Example 3 describes particular components and tests utilized according to specific parameters, it should be understood that the claimed devices and/or methods may be implemented in a variety of scenarios, including scenarios other than the solution preparation and/or assays described herein. For example, claimed devices and/or methods may be implemented in any situation where there is a need to prepare and/or pipette a consistently homogenous solution.

Example Methods and Aspects

FIG. 7 shows a flowchart of an example of a method 700 for pipette alignment and withdrawal, according to an example implementation. The method 700 shown in FIG. 7 presents an example of a method that could be used with the pipette alignment device 100 and pipette assembly 200 shown in FIG. 1A-5E, for example. Further, devices or systems may be used or configured to perform logical functions presented in FIG. 7. In other examples, components of the devices and/or systems may be arranged to be adapted to, capable of, or suited for performing the functions, such as when operated in a specific manner. Method 700 may include one or more operations, functions, or actions as illustrated by one or more of blocks 702-704. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 702, method 700 involves withdrawing, via a pipette, a first volume of a solution from a vial, wherein the vial is held by a vial receptacle of a base, wherein a pipette is held vertically by a support structure coupled to an upper portion of the base, and wherein the support structure is configured to support the pipette such that a pipette tip is positioned at one or more predetermined depths within the vial.

In some example embodiments, the support structure is associated with an adjustable platform in a first configuration, and wherein in the first configuration, the adjustable platform is configured to support a pipette such that an end of a pipette tip is positioned at a first predetermined depth within a vial.

In some example embodiments, withdrawing the first volume of the solution from a vial comprises withdrawing a predetermined volume of the solution.

Further, in some examples, the solution comprises paramagnetic beads, and withdrawing the first volume of the solution comprises withdrawing the first volume of the solution at a center of a horizontal plane of a vial of the solution of the paramagnetic beads.

Additionally, in some example embodiments, in the first configuration, the adjustable platform comprises a first stackable card stacked on top of a second stackable card.

At block 704, method 700 involves withdrawing, via a pipette, a second volume of the solution from a vial.

In examples where the support structure is associated with an adjustable platform, the adjustable platform can be in a second configuration, wherein in the second configuration, the adjustable platform is configured to support a pipette such that an end of a pipette tip is positioned at a second predetermined depth within a vial.

In some example embodiments, withdrawing the second volume of the solution from a vial comprises withdrawing a predetermined volume of the solution.

In some example embodiments, where the solution comprises paramagnetic beads, (e.g., paramagnetic beads comprising two or more unique bar codes) the method can further include conducting a first assay of the solution and the paramagnetic beads after a pipette tip is positioned at the first predetermined depth. Additionally, in some embodiments, the method further includes conducting a second assay of the solution and the paramagnetic beads after a pipette tip is positioned at the second predetermined depth.

Additionally, in some examples, the method further includes removing the adjustable platform from the support structure. In these examples, the method can additionally include withdrawing, via a pipette, a third volume of the solution from a vial, wherein the support structure is configured to support a pipette such that a pipette tip is positioned at a third predetermined depth within a vial.

In one aspect, in example embodiments, a device comprising a base and a support structure is disclosed. In example embodiments, the base includes a vial receptacle for holding a vial. In example embodiments, the support structure is coupled to an upper portion of the base and is configured to align a pipette comprising a pipette tip vertically over the vial receptacle. In some example embodiments, the support structure is configured to support a pipette such that an end of a pipette tip is positioned one or more predetermined depths within a vial in the vial receptacle.

In one aspect, in example embodiments, the device further comprises an adjustable platform detachably associated with the support structure, the adjustable platform configured to support a pipette such that an end of the pipette tip may be positioned over a series of predetermined depths with a vial in the vial receptacle. In example embodiments, the adjustable platform comprises a first stackable card comprising a first opening configured to receive a pipette tip. In example embodiments, the series of predetermined depths comprises a first predetermined depth corresponding to a first solution withdrawing event. In example embodiments, the first stackable card comprises a first label corresponding to the first solution withdrawing event.

In another aspect, the adjustable platform further comprises a second stackable card comprising a second opening configured to receive a pipette, wherein the first and second stackable cards are stacked vertically on the support structure and the first and second openings are axially aligned for simultaneously receiving a pipette. In example embodiments, the first and second stackable cards are independently detachable from the adjustable platform, and the first and second stackable cards are attached to the adjustable platform by a fastening mechanism. In example embodiments, the fastening mechanism is a ring.

In another aspect, in example embodiments, the series of predetermined depths comprises a first predetermined depth and a second predetermined depth, and a thickness of the first card determines the first predetermined depth of an end of a pipette tip in a vial and a thickness of the second card determines the second predetermined depth of an end of a pipette tip in a vial when a pipette is supported on the adjustable platform. In example embodiments, the second predetermined depth corresponds to a second solution withdrawing event, and the second stackable card comprises a second label corresponding to the second solution withdrawing event.

In another aspect, in example embodiments, the support structure comprises a plate and a first sidewall extending vertically from a first portion of the plate to align a pipette in the device. In example embodiments, the support structure further comprises a second sidewall extending vertically from a second portion of the plate to further align a pipette in the device and, in combination with the first sidewall, stabilize a pipette in the device. In example embodiments, the plate is attached to the adjustable platform.

The singular forms of the articles "a," "an," and "the" include plural references unless the context clearly indicates otherwise. For example, the term "a compound" or "at least one compound" can include a plurality of compounds, including mixtures thereof.

Various aspects and embodiments have been disclosed herein, but other aspects and embodiments will certainly be apparent to those skilled in the art. Additionally, the various aspects and embodiments disclosed herein are provided for explanatory purposes and are not intended to be limiting, with the true scope being indicated by the following claims.

What is claimed is:

1. A method comprising:
   in a first configuration, withdrawing, via a pipette, a first volume of a solution from a vial, wherein:
   the vial is held by a vial receptacle of a base;
   the pipette is held vertically by a support structure coupled to an upper portion of the base;
   the support structure supports the pipette such that an end of a pipette tip is positioned at a first predetermined depth within the vial;
   the support structure is associated with an adjustable platform in the first configuration; and
   in the first configuration, the adjustable platform supports the pipette such that the end of the pipette tip is positioned at the first predetermined depth within the vial and the adjustable platform comprises a first stackable card stacked on top of a second stackable card;
   moving the adjustable platform from the first configuration to a second configuration, wherein in the second configuration, the adjustable platform is configured to support the pipette such that the end of the pipette tip is positioned at a second predetermined depth within the vial and in the second configuration, withdrawing, via the pipette, a second volume of the solution from the vial.

2. The method of claim 1, wherein the solution comprises a plurality of paramagnetic beads, wherein the plurality of paramagnetic beads comprises one or more unique bar codes, the method further comprising:
   conducting a first assay of the solution and the paramagnetic beads after the end of the pipette tip is positioned at the first predetermined depth; and
   conducting a second assay of the solution and the paramagnetic beads after the end of the pipette tip is positioned at the second predetermined depth.

3. The method of claim 2, wherein each of the paramagnetic beads of the plurality of paramagnetic beads comprises a unique bar code.

4. The method of claim 1, further comprising:
   removing the first stackable card from the adjustable platform, such that in the second configuration, the adjustable platform comprises the second stackable card.

5. The method of claim 4, further comprising:
   removing the adjustable platform from the support structure; and
   withdrawing, via the pipette, a third volume of the solution from the vial, wherein the support structure supports the pipette such that the end of a pipette tip is positioned at a third predetermined depth within the vial.

6. The method of claim 5, wherein the solution comprises paramagnetic beads, the method further comprising:
   conducting an assay of the solution and the paramagnetic beads after the end of the pipette tip is positioned at the third predetermined depth.

7. The method of claim 1, wherein withdrawing the first volume of the solution from the vial comprises withdrawing a predetermined volume of the solution.

8. The method of claim 1, wherein withdrawing the second volume of the solution from the vial comprises withdrawing a predetermined volume of the solution.

9. The method of claim 1, wherein the solution comprises paramagnetic beads, and wherein withdrawing the first volume of the solution comprises withdrawing the first volume of the solution at a center of a horizontal plane of the vial of the solution of the paramagnetic beads.

10. The method of claim 1, wherein the solution comprises paramagnetic beads and wherein withdrawing the second volume of the solution comprises withdrawing the second volume of the solution at a center of a horizontal plane of the vial of the solution of the paramagnetic beads.

11. The method of claim 1, wherein the method further comprises:
    transferring a sample of the solution onto a surface, wherein the transferred sample of solution contains a plurality of particles;
    generating a composite image of the transferred sample of solution, wherein the composite image comprises a plurality of images of the transferred sample of solution; and
    based on the generated composite image, determining a parameter of the transferred sample of solution.

12. The method of claim 11, wherein generating the composite image of the transferred sample of solution further comprises stitching the plurality of images of the transferred sample of solution into the composite image of the transferred sample of solution.

13. The method of claim 11, wherein determining a parameter of the transferred sample of solution comprises counting the plurality of particles in the transferred sample of solution.

14. The method of claim 13, wherein counting a plurality of particles in the transferred sample of solution comprises:
    detecting an edge of a particle in the composite image; and based at least in part on detecting an edge of the particle in the composite image, determining a presence of at least one particle in the composite image.

\* \* \* \* \*